United States Patent
Green et al.

(10) Patent No.: US 9,235,574 B2
(45) Date of Patent: Jan. 12, 2016

(54) SYSTEMS AND METHODS FOR PROVIDING MEDIA RECOMMENDATIONS

(75) Inventors: Benjamin Green, Cambridge, MA (US); Alex Helsinger, Somerville, MA (US); Michael Papish, Randolph Center, VT (US)

(73) Assignee: Rovi Guides, Inc., Santa Clara, CA (US)

( * ) Notice: Subject to any disclaimer, the term of this patent is extended or adjusted under 35 U.S.C. 154(b) by 21 days.

(21) Appl. No.: 13/404,294

(22) Filed: Feb. 24, 2012

(65) Prior Publication Data

US 2012/0317123 A1 Dec. 13, 2012

Related U.S. Application Data

(60) Provisional application No. 61/496,463, filed on Jun. 13, 2011.

(51) Int. Cl.
*G06F 17/30* (2006.01)

(52) U.S. Cl.
CPC .... *G06F 17/30035* (2013.01); *G06F 17/30867* (2013.01)

(58) Field of Classification Search
CPC .................. G06F 17/30035; G06F 17/30867
USPC .......................................... 707/748, E17.009
See application file for complete search history.

(56) References Cited

U.S. PATENT DOCUMENTS

| | | | |
|---|---|---|---|
| 4,870,579 A * | 9/1989 | Hey | G06F 17/30699 273/161 |
| 4,996,642 A * | 2/1991 | Hey | G06F 17/3061 273/161 |
| 7,487,072 B2 | 2/2009 | Semple et al. | |
| 7,966,324 B2 * | 6/2011 | Sathe | 707/732 |
| 8,010,539 B2 * | 8/2011 | Blair-Goldensohn et al. | 707/750 |
| 8,086,758 B1 | 12/2011 | Allan et al. | |
| 8,224,818 B2 * | 7/2012 | Tseng et al. | G06F 17/30017 707/732 |
| 8,316,396 B2 | 11/2012 | Kulick et al. | |
| 8,417,713 B1 * | 4/2013 | Blair-Goldensohn et al. | 707/751 |
| 8,600,796 B1 * | 12/2013 | Sterne et al. | G06Q 30/0201 705/7.29 |
| 2002/0107973 A1 | 8/2002 | Lennon et al. | |
| 2003/0225777 A1 * | 12/2003 | Marsh | 707/101 |

(Continued)

FOREIGN PATENT DOCUMENTS

| | | |
|---|---|---|
| EP | 1349080 A1 | 10/2003 |
| WO | WO-2012173670 A1 | 12/2012 |
| WO | WO-2012173672 A1 | 12/2012 |

OTHER PUBLICATIONS

Okanohara et al., "Assigning Polarity Scores to Reviews Using Machine Learning Techniques", R. Dale et al. (Eds.): IJCNLP 2005, LNAI 3651, pp. 314-325, 2005.*

(Continued)

*Primary Examiner* — Phuong Thao Cao
(74) *Attorney, Agent, or Firm* — Ropes & Gray LLP

(57) ABSTRACT

Systems and methods are described for providing content recommendations by maintaining preference values indicative of a user's preference (e.g., degree of like or dislike) for different assets and updating these preference values based on observed events and known relationships between events and content elements. Also disclosed herein are systems and methods for providing content recommendations using polarity scores, which represent how much user preferences for certain content differ from the average user preference for that content.

20 Claims, 14 Drawing Sheets

(56) References Cited

U.S. PATENT DOCUMENTS

| | | | |
|---|---|---|---|
| 2006/0167346 A1* | 7/2006 | Sarel | 600/300 |
| 2006/0212459 A1* | 9/2006 | Sugimura | 707/100 |
| 2007/0100908 A1 | 5/2007 | Jain et al. | |
| 2007/0294615 A1* | 12/2007 | Sathe | 715/517 |
| 2008/0208844 A1 | 8/2008 | Jenkins | |
| 2009/0234727 A1* | 9/2009 | Petty | 705/14 |
| 2009/0282044 A1* | 11/2009 | Hamilton, II et al. | G06F 17/30424 1/1 |
| 2010/0036839 A1* | 2/2010 | Kamimaeda et al. | G06F 17/30 707/602 |
| 2010/0070454 A1* | 3/2010 | Masuda et al. | H04N 7/17318 706/54 |
| 2011/0052146 A1 | 3/2011 | Murthy et al. | |
| 2011/0246459 A1* | 10/2011 | Rinearson et al. | 707/728 |
| 2012/0093054 A1* | 4/2012 | Liu et al. | 370/312 |
| 2012/0131021 A1* | 5/2012 | Blair-Goldensohn et al. | 707/750 |
| 2012/0197903 A1* | 8/2012 | Lu et al. | 707/748 |
| 2012/0245924 A1* | 9/2012 | Brun | G06F 17/2765 704/9 |
| 2012/0311633 A1* | 12/2012 | Mandrekar et al. | 725/40 |
| 2012/0317085 A1 | 12/2012 | Green et al. | |
| 2012/0317123 A1* | 12/2012 | Green et al. | G06F 17/30035 707/748 |
| 2012/0317136 A1 | 12/2012 | Papish et al. | |
| 2013/0018892 A1* | 1/2013 | Castellanos et al. | 707/748 |
| 2013/0040556 A1* | 2/2013 | Robinson | 455/3.02 |

OTHER PUBLICATIONS

Sun M., "How Does Variance of Product Ratings Matter?", Jun. 16, 2009. 42 pages, accessed online at <http://www.ibrarian.net/navon/paper/How_Does_Variance_of_Product_Ratings_Matter_.pdf?paperid=19372110> on Mar. 22, 2015.*

Ku et al., "Using Polarity Scores of Words for Sentence-Level Opinion Extraction", In Proceedings of NTCIR-6 Workshop Meeting, May 15-18, 2007, Tokyo, Japan, pp. 316-322.*

Iio J., "Evaluating the Usefulness of Online Reviews", In Proceedings of the 15th International Conference on Network-Based Information Systems (NBiS 2012), IEEE, pp. 855-860, 2012.*

Musat et al., "Recommendation Using Textual Opinions", In Proceedings of the 23rd International Joint Conference on Artificial Intelligence (IJCAI'13), Beijing, China, AAAI Press, pp. 2684-2690, 2013.*

Wang et al., "Recommendation Based on Mining Product Reviewers' Preference Similarity Network", The 6th SNA-KDD Workshop '12, Aug. 12, 2012, Beijing, China, ACM, 9 pages.*

PCT International Application PCT/US2012/025444, International Search Report and the Written Opinion of the International Searching Authority, or the Declaration, dated Jun. 13, 2012.

PCT International Application PCT/US2012/026489, International Search Report and the Written Opinion of the International Searching Authority, or the Declaration, dated Jun. 13, 2012.

* cited by examiner

1100

| | |
|---|---|
| Welcome, Sara | TALK TO US! |
| Friends Suggest | I don't like being surprised by recommendations. |
| For You | totally agree ☐ ☐ ☐ ☐ ☐ totally disagree |
| Just Added | I usually like things that other people find crazy. |
| Search | totally agree ☐ ☐ ☐ ☐ ☐ totally disagree |
| Your Profile | I'd rather ease into something new, rather than jump. |
| 1104 | totally agree ☐ ☐ ☐ ☐ ☐ totally disagree |
| | I like watching/reading/listening to controversial things. |
| | totally agree ☐ ☐ ☐ ☐ ☐ totally disagree |

SYSTEMS AND METHODS FOR PROVIDING MEDIA RECOMMENDATIONS

CROSS-REFERENCE TO RELATED APPLICATION

This application claims priority to U.S. Provisional Application No. 61/496,463, filed Jun. 13, 2011 and incorporated by reference herein in its entirety.

BACKGROUND

Modern recommendation applications typically provide one of three basic services: providing candidate recommended content for a user, providing candidate related content to an item or group of items, and defining a distance metric between users and content. Many such applications rely on techniques such as collaborative filtering, which may be reasonably successful with the first two services but fails to adequately provide the third service for any but the most mainstream content due to its inability to handle data sparsity, and often becomes intractably slow as the size of the content domain increases. Techniques like singular value decomposition improve on collaborative filtering's failures with sparse data, but also abstract and compress the data in a form that is no longer understandable by human administrators and thus cannot be readily edited or analyzed. Because details can make or break a recommendations platform, singular value decomposition techniques often fall short.

SUMMARY

Disclosed herein are systems and methods for providing content recommendations by maintaining preference values indicative of a user's preference for different content (e.g., degree of like or dislike) and updating these preference values based on observed events and known relationships between events and content.

Also disclosed herein are systems and methods for providing recommendations using polarity scores, which represent how much user preferences for a content element differ from the average user preference for that content element (e.g., "love-it-or-hate-it"). Polarity scores may also represent how concentrated user preferences are around one or more values (i.e., the "poles" of a user preference distribution). For example, reactions to the 1999 film "The Blair Witch Project" tended to fall at either end of the spectrum, with many rave ratings, many negative ratings, and few ratings in between. Although averaging all of the ratings of "The Blair Witch Project" may result in an approximately neutral rating, a randomly selected viewer is much more likely to strongly like or strongly dislike the movie rather than feel neutral about it. For polarizing content, such as "The Blair Witch Project," averaging all of the ratings may suppress more nuanced information about the distribution of viewer preferences.

The distribution of viewer preferences for content, and polarity in particular, may be used to improve the performance of content recommendation systems. The systems and methods disclosed herein use polarity scores to quantify how polarizing a content element (e.g., a movie, book, director, genre, etc.) may be, and use those polarity scores to determine which recommendations to provide. Polarity scores may be especially useful when providing recommendations to a client that is accessing the content recommendation system for the first time, in which case content with high polarity scores may be avoided until the content recommendation system learns what types of content the client prefers. By avoiding highly polarizing content at the outset, a content recommendation system may decrease the risk that a user will strongly dislike the first recommendations and abandon use of the system.

In some aspects, a system for providing content recommendations includes a memory that stores a multiple preference values associated with each of multiple content elements. Each preference value has a value between a first end point and a second end point, with the first end point representing a dislike of the associated content element (e.g., "hate it") and the second end point representing a liking for the associated content element (e.g., "love it"). The preference values may be based on user ratings of the content element (e.g., one to five stars for a musical album), for example.

The system may also include a processing device configured to determine a polarity score for each of the content elements based on the associated preference values. Each polarity score may represent an amount by which the preference values for that content element differ from an average preference value for that content element. In some implementations, the polarity score may also represent how concentrated the preference values are around two or more different preference values (e.g., to what degree the preference values are clustered around "love it" and "hate it" poles of the preference value distribution). The processing device may compare each of the polarity scores to a polarity threshold and transmit a recommendation, to a client device for display, for any content elements with polarity scores that do not exceed the threshold. In some implementations, the polarity threshold is equal to the minimum polarity score of a group of content elements (each of which may represent a potential recommendation) or the polarity threshold may be set by an administrator, for example. The recommendation may include metadata for the content element, such as a description, a title, representative video or audio clips, reviews, etc.

In some implementations, the processing device performs the comparing and transmitting steps in response to determining that a client associated with the client device has not previously accessed the recommendation system, or that the client has accessed the system fewer than a threshold number of times. If the client has accessed the system a sufficient number of times, the processing device may increase the polarity threshold (which may lead to recommending content elements with higher polarity scores).

In some aspects, a system for providing content recommendations includes a memory configured to store metadata descriptive of a content element. The content element is associated with a polarity score that does not exceed a polarity score threshold; the polarity score is based on multiple preference values associated with that content element; each preference value is between a first end point and a second end point, the first end point representing a dislike of the content element and the second end point representing a liking for the content element; and each polarity score represents an amount by which the preference values differ from an average preference value. A processing device transforms the metadata into a recommendation display for a user device, and an output device transmits the recommendation display to the user device.

BRIEF DESCRIPTION OF THE DRAWINGS

The above and other objects and advantages of the systems and methods of the present disclosure will be apparent upon consideration of the following detailed description, taken in conjunction with the accompanying drawings, in which like reference characters refer to like parts throughout, and in which:

FIG. 11 depicts an illustrative user-facing display for receiving polarity threshold information;

DETAILED DESCRIPTION OF EMBODIMENTS

Figure 1A:
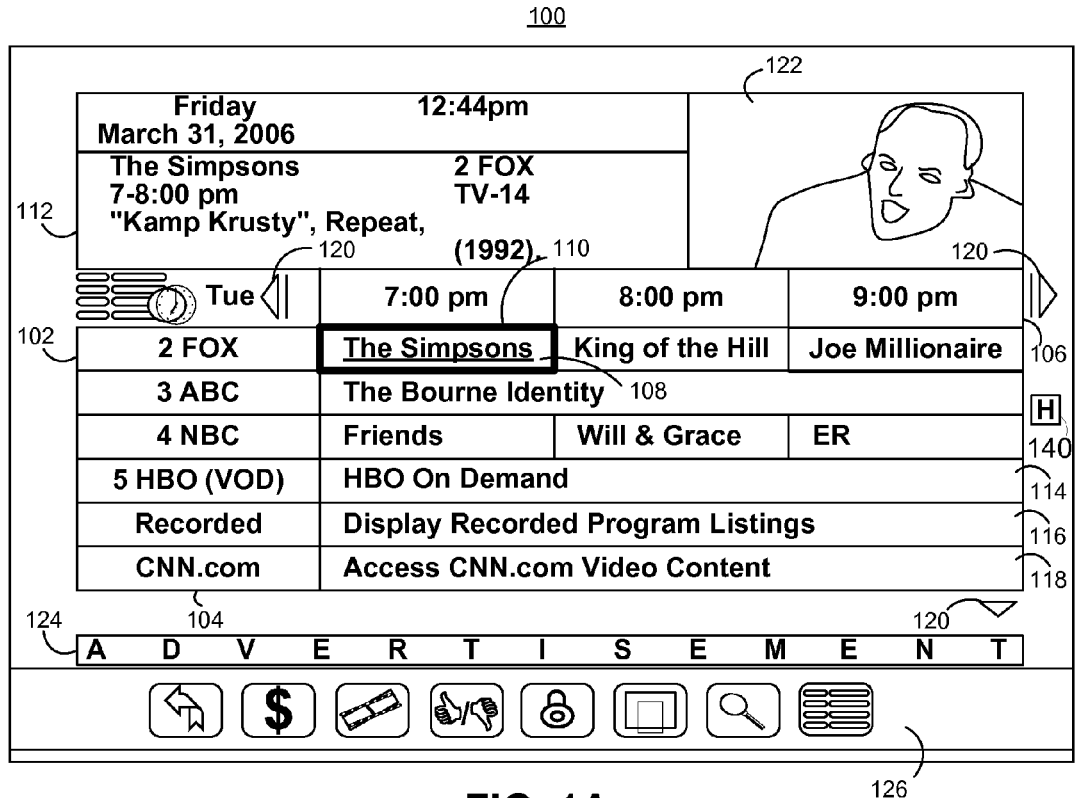
FIGS. 1A and 1B depict illustrative displays that may be used to provide interactive application items.

The recommendation systems and methods disclosed herein may be readily applied to any interactive application (e.g., interactive software, interactive websites, interactive television programs, and interactive presentations) or static application that includes aggregating data for transmitting recommendations to one or more users (e.g., a magazine feature providing product recommendations to different types of readers). As used herein, the term "recommendation" should be understood to mean information chosen to appeal to a user or group of users. Recommendations may be explicit (e.g., by presenting a particular book in a "Recommended For You" display on a website) or implicit (e.g., by presenting an advertisement for a particular product expected to appeal to a particular user or group of users). For illustrative purposes, this disclosure will often discuss exemplary embodiments of these systems and methods as applied in media guidance applications, but it will be understood that these illustrative examples do not limit the range of applications which may be improved by the use of the systems and methods disclosed herein.

The amount of information available to users in any given search, recommendation or content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application. In particular, the recommendation techniques disclosed herein may be advantageously implemented in a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, descriptions of media assets (e.g., year made, genre, ratings, reviews, etc.) and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by client devices, but can also be part of a live performance.

One of the functions of the media guidance application is to provide media guidance data to users. As referred to herein, the phrase, "media guidance data" or "guidance data" should be understood to mean any data related to content, such as metadata, recommendations, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 1B:
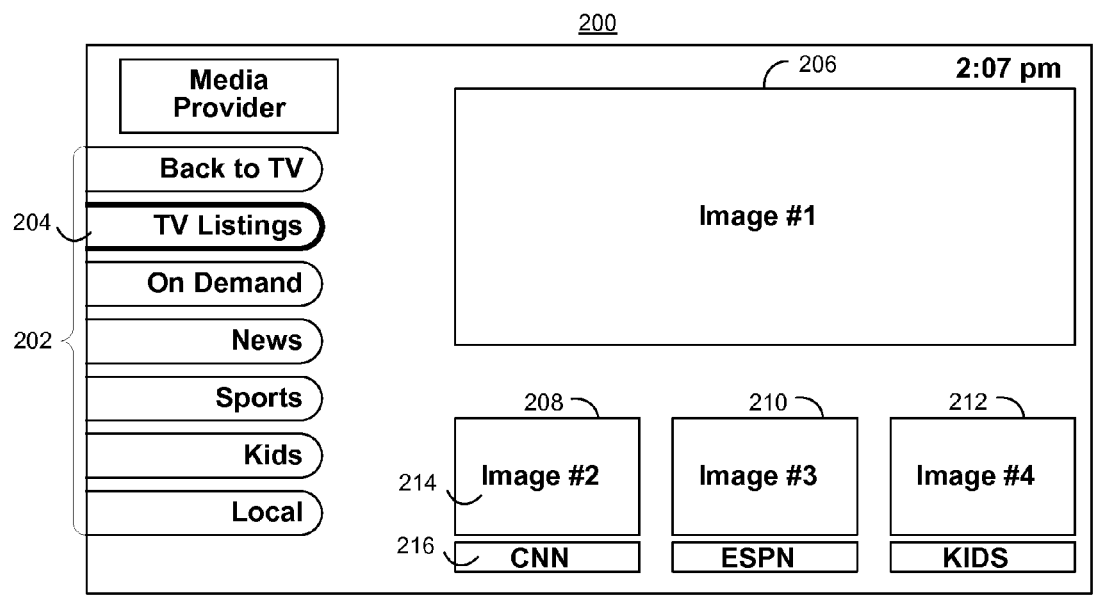
Figure 2:
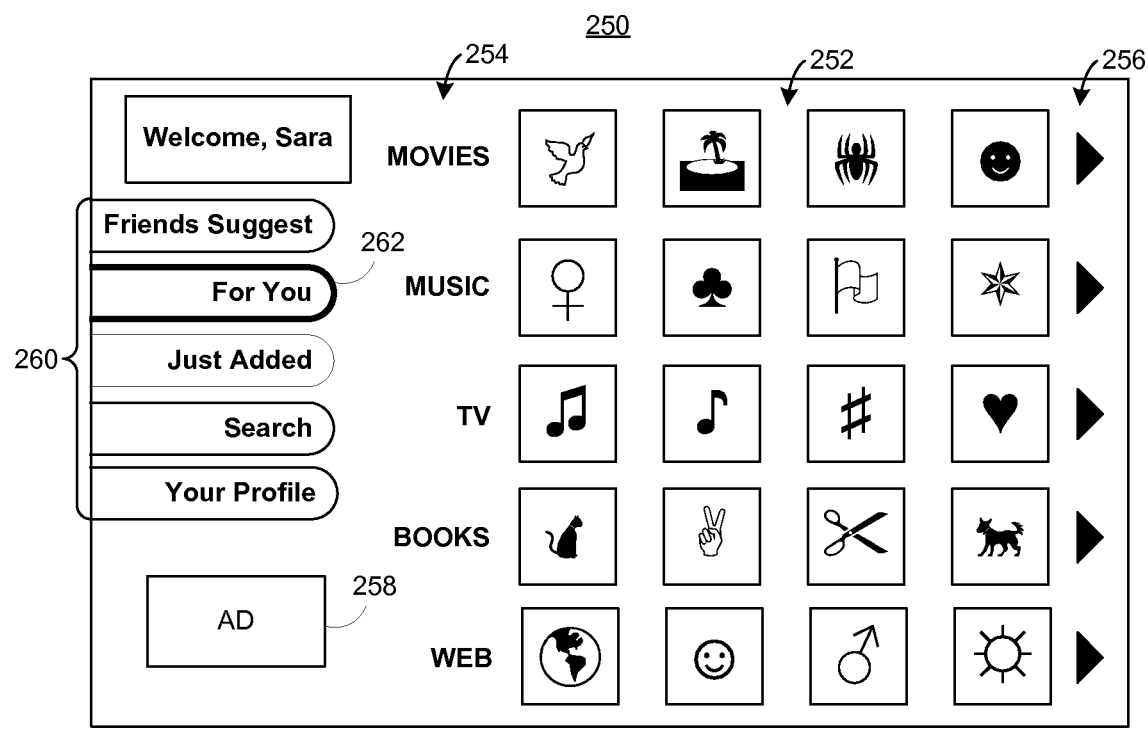
FIG. 2 depicts an illustrative recommendation display.

FIGS. 1 and 2 show illustrative display screens that may be used to provide media guidance data, including recommendations. The display screens shown in FIGS. 1-2 may be implemented on any suitable client device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information. In some implementations, the guidance application data is based on recommendations. For example, the particular channels displayed in FIG. 1 may be selected from a longer group of channels based on an expectation that the selected channels will appeal to a user. In another example, a fixed set of channels in a particular order expected to appeal to a user.

FIG. 1A shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information. As described above, the channels displayed in grid 102 may be selected using the recommendation techniques described herein.

Display 100 may also include advertisement 124, video region 122, and options region 126. The item advertised in advertisement 124 and/or the format of advertisement 124 (e.g., interactive or passive, animated or static) may be selected using the recommendation techniques described herein. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, requesting programs similar to or recommended based on a program, recording a program, enabling series recording of a program, setting a program and/or a channel as a favorite, providing negative or positive feedback for a program or channel for use in providing recommendations (e.g., via polarity scores, as described in detail below), purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

Another display arrangement for providing media guidance is shown in FIG. 1B. Video mosaic display 200 includes selectable options 202 for content information organized based on content type, genre, and/or other organization criteria. In display 200, television listings option 204 is selected, thus providing listings 206, 208, 210, and 212 as broadcast program listings. One or more of listings 206, 208, 210 and 212 may be a listing for recommended content determined in accordance with the techniques disclosed herein. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel on which the video is displayed). A user may also select recommendations option 218 to be provided with recommendations (e.g., via the display of FIG. 2 below or to provide feedback that may be used to calculate polarity scores, as discussed in detail below).

FIG. 2 is an illustrative display for providing recommendations which may be generated, for example, in response to a user selection of recommendation option 218, or in response to any other suitable user action (e.g., logging in to a search service, or launching a media guidance application). Display 250 includes a set of navigation elements 260, each of which may be selected by a user to change the information displayed (e.g., personal recommendations). In the current display, navigation element 262 is highlighted, indicating that "For You" information is displayed. In display 250, the "For You" information includes an array of content element indicators 252, each of which indicates a particular content element that is recommended for the user in an associated content domain 254 (e.g., "movies," "music," "TV," etc.). Each content element indicator may indicate an asset (e.g., the movie "Top Gun"), a genre (e.g., the musical genre of "Death Metal"), an artist (e.g., the author J. K. Rowling) or any other content element that is expected to appeal to the user as determined by the systems and techniques described herein. A user may select "more" icon 256 to view more recommendations on a display in a particular content domain. In some embodiments, recommendations are not displayed by content domain, but are displayed according to chronology, in order of user preference, clustered by common elements (e.g., common actions, common themes or common rating, or are arranged randomly. Each of the indicators 252 may be user-selectable (e.g., via mouse click, double-touch, or hover-over), the recommendation systems described herein may provide additional information about the content element and/or allow the user to access assets associated with the content element. Display 250 includes advertisement 258, which may advertise a product, service or other purchasable item. As described above with reference to advertisement 124 of FIG. 1A, the item advertised by advertisement 258 may be selected using the recommendation techniques described herein based on a user's preference or determined by the preference updating process of FIG. 6, by direct inclusion of the item as a content element, or by a separate determination that the advertised item is related to content elements that the media guidance application has determined that a client may like. Further discussion of various configurations for the display screens of FIG. 1-2, as well as several other exemplary displays, are presented elsewhere herein.

Figure 3A:
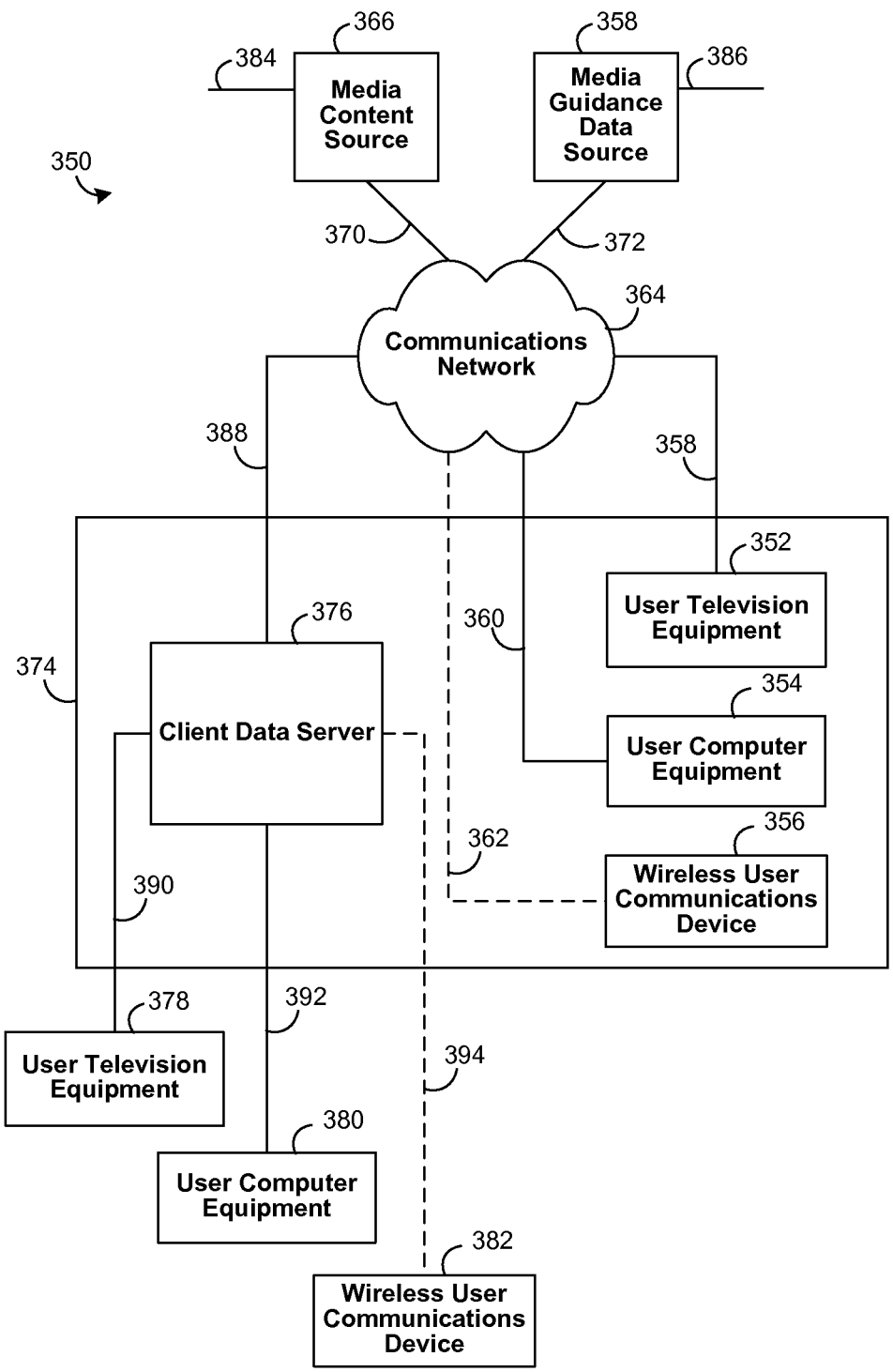
FIG. 3A is a block diagram of an illustrative interactive media system which may be used with various embodiments.

FIG. 3A is a block diagram of an illustrative interactive media system 350. System 350 includes media content source 366 and media guidance data source 368 coupled to communications network 364 via communication paths 370 and 372, respectively. Paths 370 and 372 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with media content source 366 and media guidance data source 368 may be exchanged over one or more communications paths, but are shown as a single path in FIG. 3A to avoid overcomplicating the drawing. In addition, there may be more than one of each of media content source 366 and media guidance data source 368, but only one of each is shown in FIG. 3A to avoid overcomplicating the drawing. Different possible types of each of these sources are discussed below. If desired, media content source 366 and media guidance data source 368 may be integrated as one source device. Media content source 366 and media guidance data source 358 include inputs 384 and 386, respectively, for receiving data from external sources.

In some implementations, a media guidance application is implemented on a client server, which receives data from a media guidance data source (such as media guidance data source 368) and uses that data to provide a media guidance application to one or more client devices. In some implementations, the media guidance application executes directly on the client device; in this case, the client device is itself a client of the media guidance data source. As used herein, the term "client" or "client device" should be understood to mean any device that receives media guidance data (such as recommendations) from a media guidance data source. A user device, then, is a particular example of a client device. Client devices 374 may be coupled to communications network 364. Namely, user television equipment 352, user computer equipment 354, and wireless user communications device 356 are coupled to communications network 364 via communications paths 358, 360, and 362, respectively. Client devices 374 may include client data server 376, which has additional client devices: user television equipment 378, user computer equipment 380, and wireless user communications device 382. Communications network 364 may be one or more networks including the Internet, a mobile phone network, mobile voice or data network (e.g., a 4G or LTE network), cable network, public switched telephone network, or other types of communications network or combinations of communications networks. Paths 358, 360, 362, 388, 390, 392 and 394 may include any of the communication paths described above in connection with paths 370 and 372. Paths 362 and 394 are drawn with dotted lines to indicate that, in the exemplary embodiment shown in FIG. 3A, they are wireless paths, and paths 358, 360, 388, 390 and 392 are drawn as solid lines to indicate they are wired paths (although these paths may be wireless paths, if desired). Various network configurations of devices may be implemented and are discussed in more detail below. Although communications between sources 366 and 368 and client devices 374 are shown as through communications network 364, in an embodiment, sources 366 and 368 may communicate directly with client devices 374 via communication paths (not shown) such as those described above in connection with paths 370 and 372. Additional discussion of suitable configurations of system 350 is presented elsewhere herein.

Figure 3B:
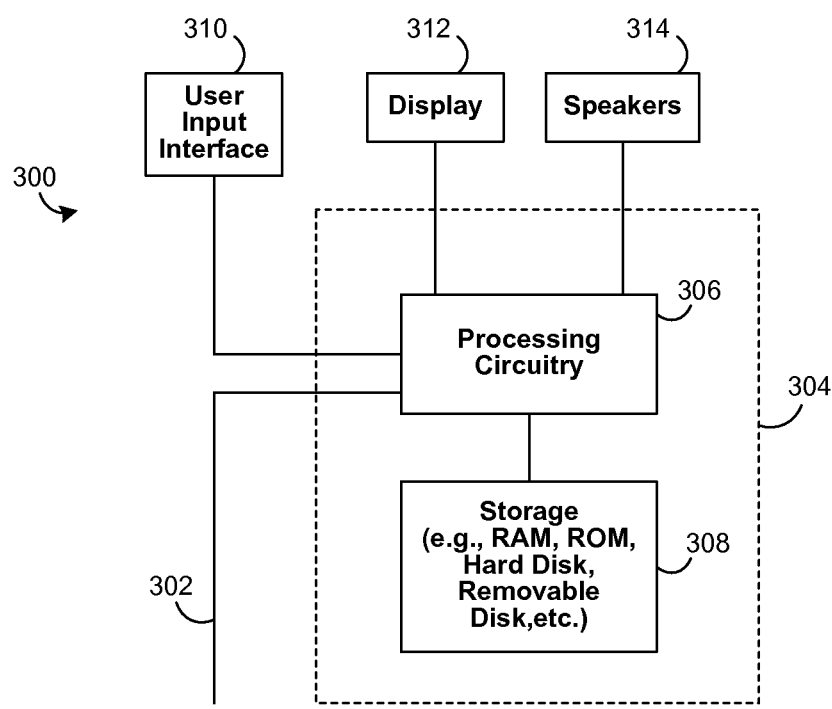
FIG. 3B depicts an illustrative client device.

Client devices 374 of FIG. 3A can be implemented in system 350 as any type of equipment suitable for accessing content and/or media guidance data, such as a non-portable gaming machine. Client devices, on which a media guidance application may be implemented, may function as standalone devices or may be part of a network of devices. FIG. 3B shows a generalized embodiment of illustrative client device 300. More specific implementations of client devices are discussed below in connection with FIG. 3A. Client device 300 may receive content and data (such as recommendation data) via input/output (hereinafter "I/O") path 302. I/O path 302 may provide content (e.g., broadcast programming, on-demand programming, Internet content, content available over a local area network (LAN) or wide area network (WAN), and/or other content) and data (such as media guidance data) to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3B to avoid overcomplicating the drawing. In some implementations, client device 300 is a user device through which a user may access content and the media guidance application (and its display screens described above and below). In some implementations, client device 300 is a server or other processing system that acts as an intermediary between media guidance data (such as recommendation data) and one or more user devices.

An operator may send instructions to control circuitry 304 using input interface 310. Input interface 310 may be any suitable interface, such as a remote control, mouse, trackball, keypad, keyboard, touch screen, touchpad, stylus input, joystick, voice recognition interface, or other input interfaces. Display 312 may be provided as a stand-alone device or integrated with other elements of client device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of client device 300 or may be stand-alone units. The audio component of videos and other content displayed on display 312 may be played through speakers 314. In some embodiments, the audio may be distributed to a receiver (not shown), which processes and outputs the audio via speakers 314. In some implementations, client device 300 may not include one or more of display 312 and speakers 314.

Figure 4:
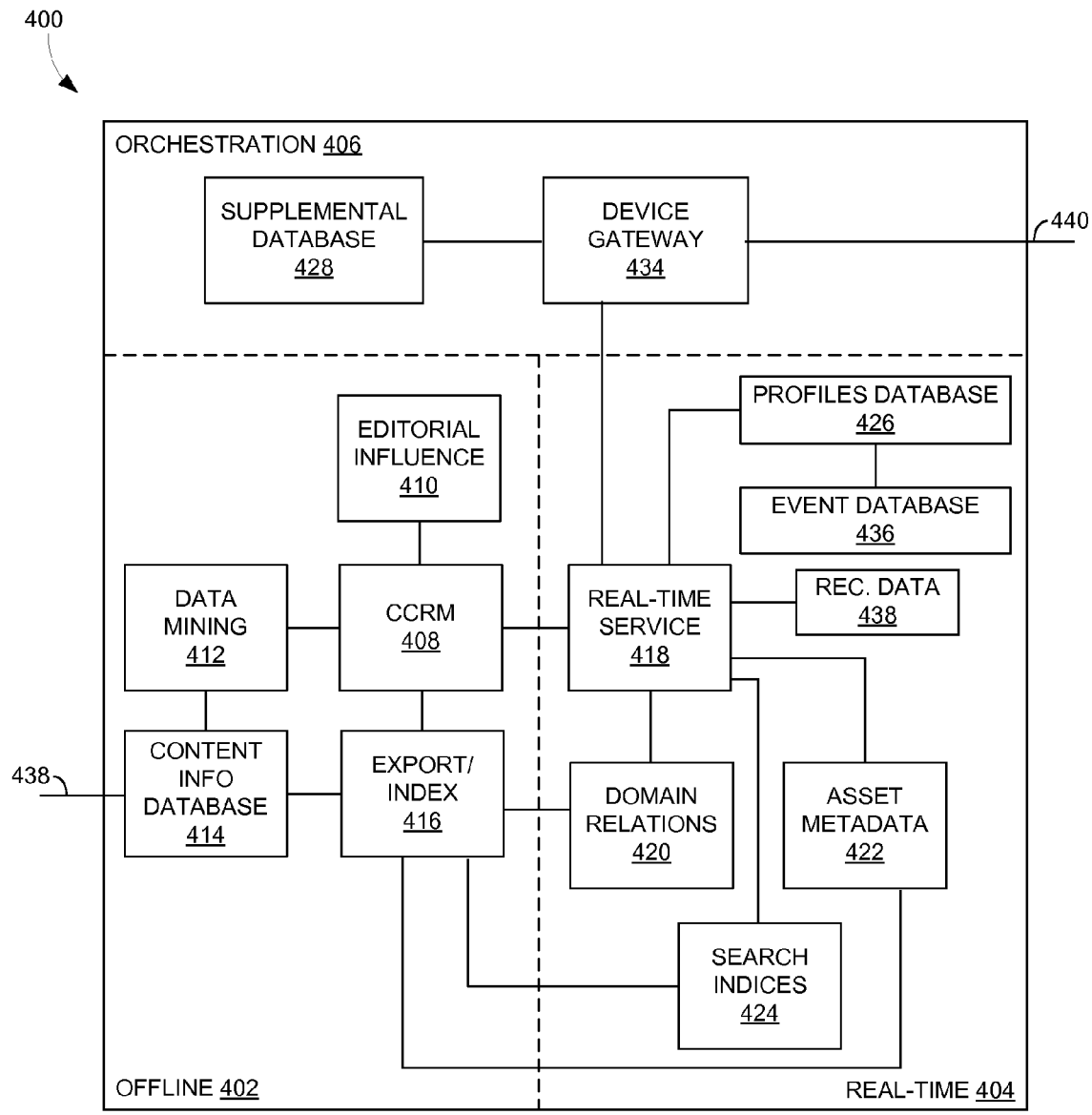
FIG. 4 is a block diagram of a catalog and recommendation system.

FIG. 4 is a block diagram of catalog and recommendation system 400, one embodiment of media guidance data source 368 of FIG. 3A. In some implementations, the components of catalog and recommendation system 400 are distributed between multiple processing and storage devices; for example, the components of catalog and recommendation system 400 may be divided between media guidance data source 368, media content source 366 and client data server 376 (FIG. 3A). Catalog and recommendation system 400 is illustrated as divided into three functional components, each of which include one or more processing devices and storage devices (such as these described above with reference to client device 300 of FIG. 3B): orchestration component 406, offline component 402 and real-time component 404. Offline component 402 may be configured to perform many of the back-end cataloging processes described in co-pending application Ser. No. 13/404,574, filed Feb. 24, 2012, entitled "Systems and methods for transmitting content metadata for multiple data records," which is incorporated by reference herein in its entirety. In particular, offline component 402 includes content information database 414, which may receive media data records from one or more data sources via input 438 (which may correspond to input 386 of media guidance data source 368 of FIG. 3A). Content information database 414 includes memory hardware configured to operate in any of a number of database architectures, such as a relational database management system or a document-based database architecture like NoSQL. Content information database 414 also includes a processing engine executed on one or more database servers to receive, store and serve data stored in memory. Any of the database hardware and architecture configurations described herein, including those described above with reference to content information database 414, may be used for any of the databases or data storage systems described herein. In some embodiments, the media data records received at input 438 are electronic signals representative of media content or information about media content (referred to herein as "content metadata" or "metadata"). Signals received at input 438 may be provided by third-party data providers (such as cable television head-ends, web-based data sources, catalog management organizations, or real-time or other data feeds) or from users supplying content or metadata to recommendation system 400. Signals received at input 438 may take the form of a file of multiple data records, or through a message bus that provides new data records and updates to previous data records as changes are made, for example. In some implementations, content information database 414 is coupled with one or more processing devices configured to extract metadata from data records arranged in a tabular format and to store that metadata in content information database 414. In some implementations, content information database 414 may "catalog" the information received at input 438 in a memory (e.g., local, remote or distributed) according to a data schema, as described in additional detail below.

Information from database 414 may be transmitted (by one or more servers associated with database 414) to data mining processor 412. Data mining processor 412 is configured to extract information from database 414 and process the extracted information to reconcile information from multiple sources (e.g., data records from multiple catalog management systems). In some implementations, data mining processor 412 includes a memory device configured as a database for storing one or more tokens used in performing the domain-based tokenization techniques described in co-pending application Ser. No. 13/404,498, filed Feb. 24, 2012, entitled "Systems and methods for domain-specific tokenization," which is incorporated by reference herein in its entirety. Data mining processor 412 may also transmit the reconciled information to core content relations management ("CCRM") module 408. As used herein, the term "module" should be understood to mean a processing device executing programming logic, such as source code, or higher-level code (e.g., Java code executed via a Java compiler), stored in a memory device (e.g., RAM, ROM, removable memory media, Flash memory, optical dishes, etc.). In some implementations, CCRM module 408 includes a MySQL database of reconciled data. Systems and methods for reconciling data in an aggregate catalog, which may be implemented by data mining processor 412 in conjunction with CCRM module 408 and the rest of offline component 402, are described in co-pending application Ser. No. 13/404,574, filed Feb. 24, 2012, entitled "Systems and methods for transmitting content metadata for multiple data records," which is incorporated by reference herein in its entirety.

CCRM module 408 may also receive information from editorial influence module 410. In some embodiments, editorial influence module 410 receives metadata from human or computer editors, and augments the information that is automatically catalogued with this "editorial" metadata. Editorial influence module 410 includes a server configured to provide a web-based interface between human editors and the database of CCRM module 408. In some implementations, editorial influence module 410 includes a Java application running on an Apache Tomcat web server, but may be executed on any processing device or devices with a user interface. Human editors may interact with the web-based interface using a personal computer connected to the Internet, a handheld device, or any of the client devices (such as client device 300 of FIG. 3B) described herein. Editorial metadata is described in additional detail below with reference to FIG. 14.

Information from database 414 may also be transmitted (e.g., by one or more servers associated with database 414) to export/index processor 416. Export/index processor 416 queries CCRM module 408 to extract catalog information from CCRM module 408 and formats this information for use in different modules of real-time component 404 (as described in detail below). Export/index processor 416 may be configured to extract information in batches on a regular interval (e.g., every twenty-four hours) and format and transmit this batched information to a dependent module, or may be configured to extract information as it is updated in CCRM module 408. As shown in FIG. 4, export/index processor 416 transmits information to domain relations module 420, search indices module 424, and metadata module 422. These modules serve as "quick" sources of certain common types of information for real-time service processor 418 (described in detail below); instead of requiring real-time service processor 418 to query CCRM module 408 whenever a particular kind of metadata is desired, real-time service processor 418 may instead query one of these modules to obtain the information. Domain relations module 420 includes a data storage device configured as a database for storing metadata about relationships between media content and descriptors of media content (such as genre, actors, media domain, rating, etc.). Content metadata module 422 includes a data storage device configured as a database for storing frequently requested metadata. Additionally, metadata module 422 may include only those metadata fields that are commonly used for the recommendation techniques executed by real-time service processor 418. In some implementations, metadata module 422 stores a subset of the data stored in CCRM module 408 in a format that can be easily filtered according to the parameters of a search or recommendation request (e.g., a tabular format that can be quickly filtered to exclude movies rated "R" and above). Search indices module 424 includes a data storage device configured as a database for storing search heuristics that may be used by real-time service processor 418 to improve search performance. Many search techniques utilize heuristics such as removing spaces from search queries, transforming queries into lower-case characters, comparing a search query against a list of common variations and misspellings, and identifying one or more n-grams within a search query, among others.

Real-time service processor 418 receives information from domain relations module 420, metadata module 422 and search indices module 424, as described above, and provides recommendation information to client devices (such as client device 300). The components of catalog and recommendation system 400 may be distributed between multiple processing and storage devices; for example, the components of catalog and recommendation system 400 may be divided between media guidance data source 368, media content source 366 and client data service 376 (FIG. 3B) via device gateway 434 in orchestration component 406. Device gateway 434 may include any transmission path suitable for communicating recommendation information, such as the path 372 between media guidance data source 368 and communication network 364 and paths 358, 360, 362 and 388 between communication network 364 and client devices 374 (FIG. 3A). In particular, real-time service processor 418 is configured to provide metadata in response to various types of client queries (e.g., for metadata matching a search term, for metadata on content related to a particular content item, etc.). Real-time service processor 418 may provide, for example, identifiers of particular content as well as metadata for that content (e.g., album art in response to a music search request). Real-time service processor 418 may execute any of the recommendation techniques described in detail below. Real-time service processor 418 may also query CCRM module 408 directly, or provide feedback to CCRM module 408 as an application on a client device interacts with catalog and recommendation system 400 through device gateway 434. In some implementations, real-time service processor 418 is implemented as a web service executing on an Apache Tomcat or other server.

Figure 6:
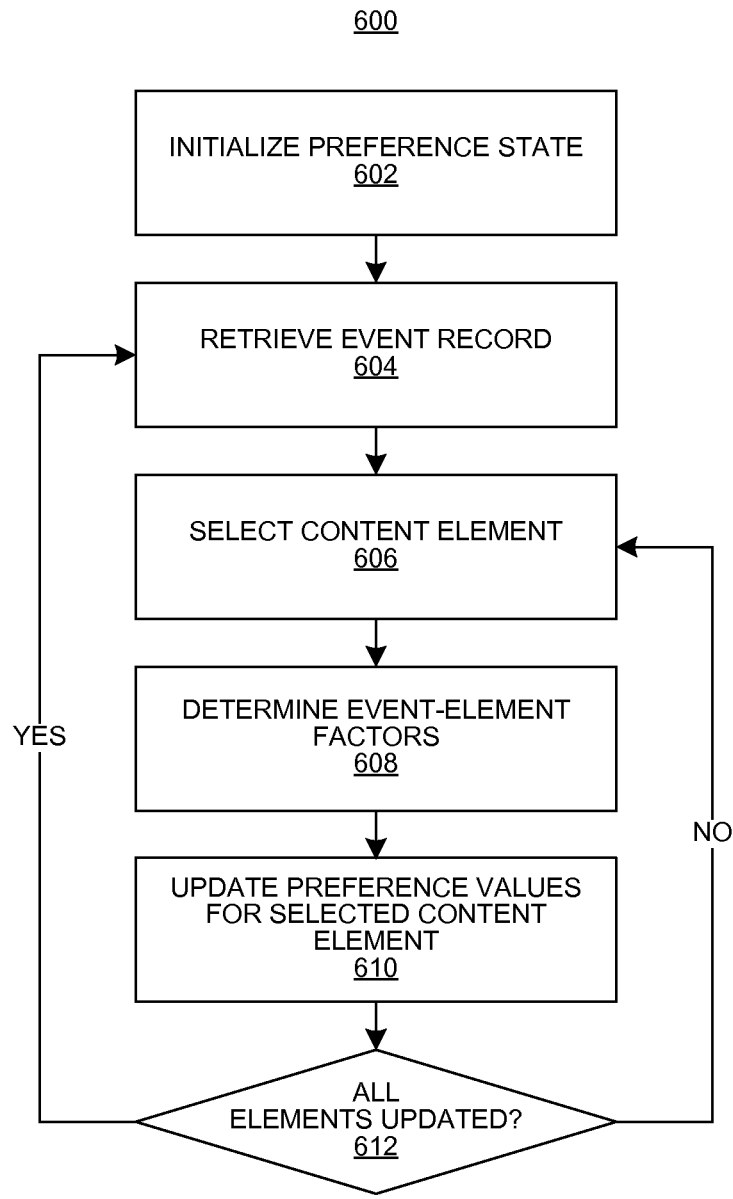
FIG. 6 is a flow diagram of a preference updating process.

Real-time service processor 418 also communicates with profiles database 426, which may include a data storage device configured as a database for storing information about client preferences (including preference values calculated by real-time service processor 418 as described herewith reference to FIG. 6), client equipment, client event history, or other information relevant for transmitting recommendations and data to a client. In some implementations, profiles database 426 stores profile information individual users (who may be users of an intermediate client service). Media guidance applications (such as recommendation applications) may be personalized based on a client's preferences as stored in profiles database 426. A personalized media guidance application allows a client to customize displays and features to create a personalized "experience" with the media guidance application. The customizations may include varying presentation schemes (e.g., color scheme of displays, font size of text, etc.), aspects of content listings displayed (e.g., only HDTV or only 3D programming, client-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations. This personalized experience may be created by allowing a client (such as a user) to input these customizations and/or by the media guidance application monitoring user activity to determine various user preferences.

Clients may access their personalized guidance application by logging in, communicating with catalog and recommendation system 400 using a designated protocol over path 440, or otherwise identifying themselves to the guidance application. The media guidance application may allow a client to provide profile information for profiles database 426 or may automatically compile profile information. The media guidance application may, for example, monitor the content the client accesses and/or other interactions the user may have with the guidance application, including responses to and feedback based on recommended content. Profiles database 426 may communicate with event database 436, which may store event records that contain information about client interactions with catalog and recommendation system 400. Profiles database 426 may access event database 436 to reconstruct a client's history of use of catalog and recommendation system 400 and to determine content preferences as described in detail below (e.g., with reference to FIG. 6). Additionally, the media guidance application may obtain all or part of other profiles that are related to a particular client (e.g., from other web sites on the Internet the client accesses, such as www.all-rovi.com, from other media guidance applications the client accesses, from other interactive applications the client accesses, from another device of the client, etc.), and/or obtain information about the client from other sources that the media guidance application may access. As a result, a client can be provided with a unified guidance application experience across the client's different devices. This type of experience is described in greater detail below. Additional personalized media guidance application features are described in greater detail in Ellis et al., U.S. Patent Application Publication No. 2005/0251827, filed Jul. 11, 2005; Boyer et al., U.S. Pat. No. 7,165,098, issued Jan. 16, 2007; and Ellis et al., U.S. Patent Application Publication No. 2002/0174430, filed Feb. 21, 2002, which are hereby incorporated by reference herein in their entireties.

Real-time service 418 transmits information to and receives information from client devices by way of path 440 and device gateway 434. As described above with reference to paths 370 and 372 of FIG. 3A, path 440 may include one or more communication paths such as a satellite path, a fiber-optic path, a cable path, a path that supports Internet communications, free-space connections, or any other suitable wired or wireless communications path or combination of such paths. Device gateway 434 may be, for example, a web service implemented on one or more server devices, configured to receive requests from client devices via path 440. The client devices that communicate with device gateway 434 may be client devices 374 of FIG. 3A. These client devices may take the form of client device 300 (FIG. 3B), for example, and may communicate with device gateway 434 via I/O path 302 (FIG. 3B). The data provided to client devices via path 440 may be supplemented by data from supplemental database 428, which may store metadata and media content that is provided along with the information transmitted from real-time service processor 418 to device gateway 434. Supplemental database 428 may include, for example, media content source 366 (FIG. 3A). For example, in response to a call to device gateway 434 from a client device, device gateway 434 may send a search or recommendation request to real-time service processor 418. Real-time service processor 418 may respond by sending a list of content identifiers that satisfy the request back to device gateway 434, at which point device gateway 434 will request appropriate supplementary information from supplemental database 428 (e.g., clips of videos whose identifiers are included in the data provided to device gateway 434 by real-time service processor 418). In some implementations, supplemental database 428 is populated with information from content information database 414, domain relations module 420, metadata module 422 or search indices module 422, or may be the same as one or more of these databases or modules.

Figure 5:
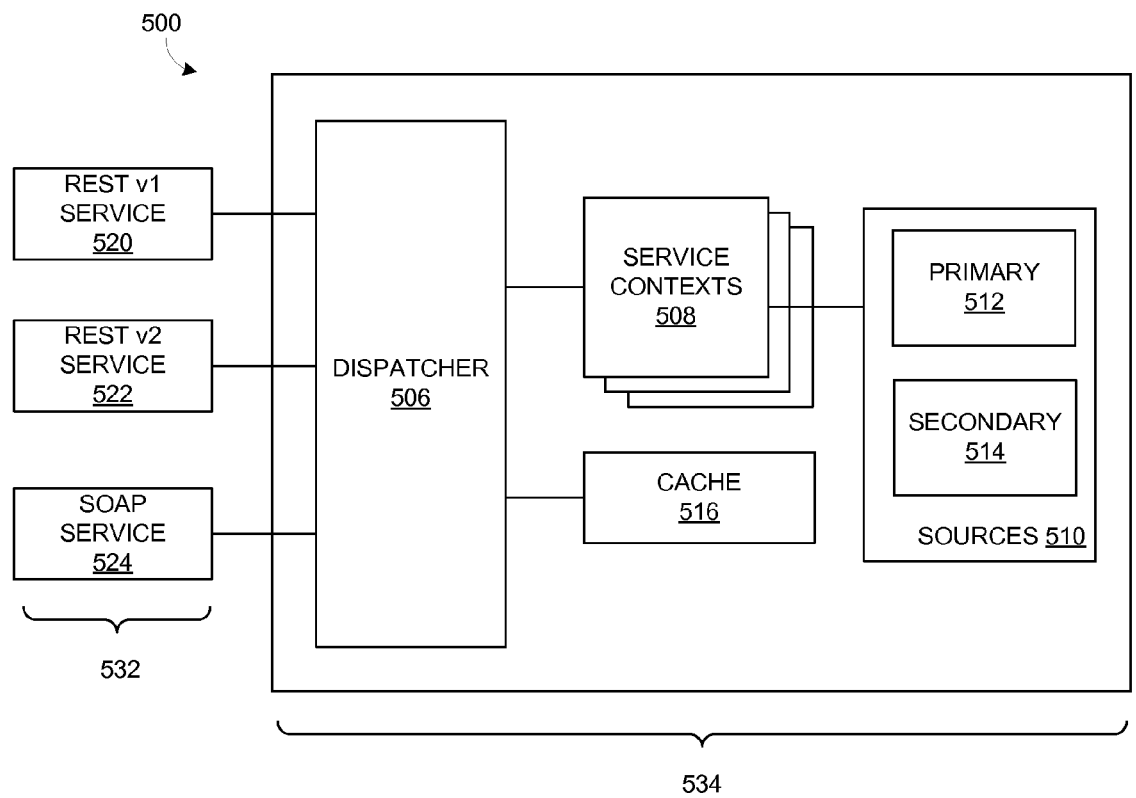
FIG. 5 is a block diagram of a service processor.

FIG. 5 is a block diagram of service processor 500, one possible implementation of real-time service processor 418 (FIG. 4A) and media guidance data source 368 (FIG. 3A). Service processor 500 may be functionally organized into web service tier 532 and orchestration tier 534. Orchestration tier 534 includes dispatcher processor 506, one or more service context modules 508, sources 510 and cache 516. Dispatcher processor 506 manages the flow of data between web service tier 532 and other components in orchestration tier 534, and in particular, responds to requests from web service tier 532 by checking to see whether data stored in cache 516 satisfies the request or determining which of service context modules 508 to call to satisfy the request. Requests from web service tier 532 may represent requests from client devices (such as client devices 374 of FIG. 3A) received via path 440 and device gateway 434 (FIG. 4), for example. In some implementations, dispatcher processor 506 includes processing hardware configured to execute a Java application to perform the operations described herein. Cache 516 includes a memory device that stores data recently received from or transmitted to the web service tier 532, thus providing a "quick" source for data that may be requested or used multiple times. Each of sources 510 includes computer-executable code (e.g., Java code) for performing a particular search or recommendation operation. For example, a source may include code that may be executed to perform a search of a particular database, or may include code that may be executed to identify similar items to a specified item within a catalog. Sources 510 include primary sources 512, which include basic or common search or recommendation operations, and secondary sources 514, which include custom implementations of particular search or recommendation operations (e.g., for particular clients) or implementations of search or recommendation operations that build on or use primary source operations stored as primary sources 512. Collections of one or more sources 510 are stored as service context modules 508, each of which specifies a particular set of one or more of sources 510 to use when satisfying requests (e.g., from particular regions like North America or Europe, or from particular customers). In some implementations, service context modules 510 are represented as XML files.

Dispatcher processor 506 is also in communication with a number of service modules in web service tier 532, including REST v1 service module 520, REST v2 service module 522, and SOAP service module 524. These different service modules provide interfaces and transport mechanisms for accessing the "back-end" processing and data of orchestration tier 532. REST and SOAP are two different ways of packaging input and output data, and any other such protocols may be used. In some embodiments, service processor 500 includes processing and networking hardware configured with a software platform for serving dynamically generated recommendations applications in XML and JSON.

In some embodiments, index/export module 416 (FIG. 4) or service processor 500 (FIG. 5) includes one or more data contracts. Data contracts are electronic data files, encoded in a data definition language, that define a type and structure of data available to an application that accesses a service that operates according to the contract. When an application accesses a contracted service, the application can parse the contract to determine what data (e.g., assets, metadata, recommendations, etc.) the service can provide. A single service may be instantiated multiple times with different contracts, with each contract governing a different type of data. A service may advertise the data types and structures that, according to the contract, the service can provide to applications. The application may receive this information and determine which services provide data of a type and structure that is compatible with the application's own purpose and architecture. Multiple services, each with its own contract or contracts, may communicate with each other, passing data through the services and transforming the data, repackaging the data, or adding content along the way. In some embodiments, a service determines the contracts that it advertises based on the contracts that it reads in from other services (indicating the data types and structure to which the service has access), plus additional fields and operations that represent additional functionality provided by the service itself.

The types and structure of data specified in a contract may take any of a number of forms. For example, a recommendation system may receive a search or other query and may return pointers to media assets and fields containing metadata about those media assets. Thus, in some configurations of service processor 500 (FIG. 5), each of services 520, 522 and 524 advertises the operations the service supports, the types of data that the service can return per operation, and the fields it can return per data type per operation. A field may be single- or multi-valued, optional or required, and stored as strings or more complex data objects (such via a map to an internal object through JSON). The same contract can also be used in different service contexts, which utilize different sets of underlying source data (e.g., different third-party metadata catalog).

As described above, the systems and devices of FIG. 3-5 may be configured to execute or support media guidance applications that provide recommendations to clients for media in which a user may be interested. Disclosed herein are systems and methods for providing content data that use information about events to dynamically determine relationships between content elements and thereby update preference predictions for clients. The term "event" is used herein to refer to any activity which provides information about a user's (or group of users') preferences for or against a content element. Examples of events include, but are not limited to, downloads, purchases, subscriptions to a magazine or web site, tweets and re-tweets, click-through, views, visits, bids, and Facebook "likes." Events may be measured individually (e.g., a user viewed a particular You tube video), statistically (e.g., a user spent an average of four minutes per day visiting a fan web site last month), aggregated over multiple users (e.g., a particular song has been downloaded two million times by all users associated with a particular intermediate client), or any combination of these or other measures. The term "content element" is used herein to refer to any asset, category, feature, property or other characteristic of content whose preference value is tracked by catalog and recommendation system 400 according to the methods described herein. Examples of content elements include particular assets (e.g., the Beatles' "White Album"), or descriptors such as categories (e.g., detective novels), attributes (e.g., actors, directors, language), or any other piece of information about content that a user may have a preference for or against.

Figure 9:
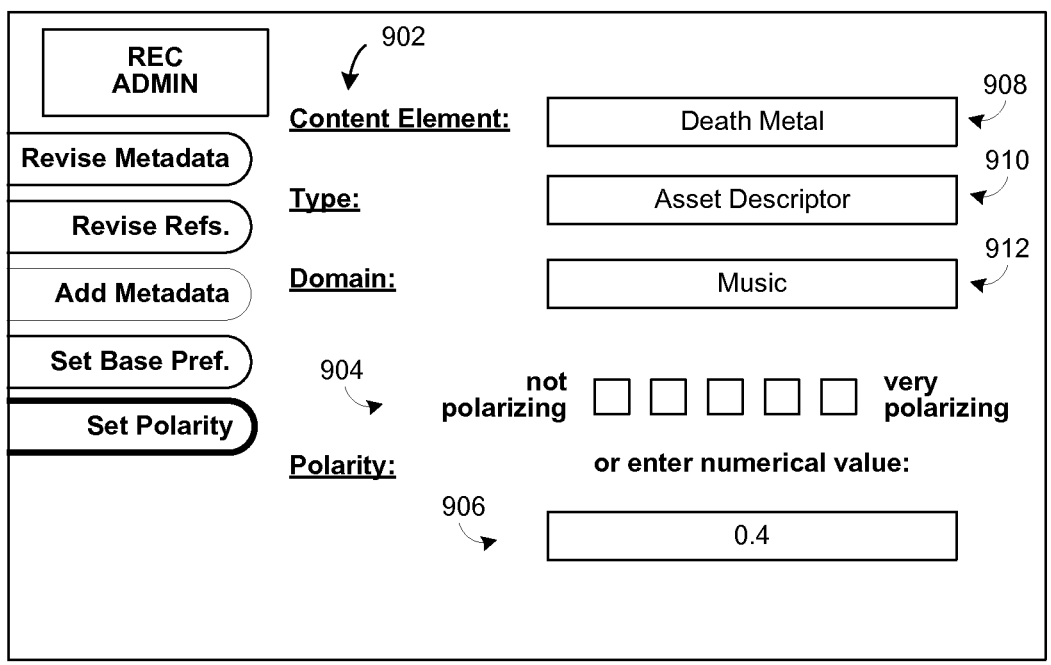
FIG. 9 depicts an illustrative administrator-facing display for receiving polarity information.

FIG. 6 is a flow diagram of a preference updating process that may be used with the recommendation techniques described herein. Although the steps of flow diagram 600 (as well as the steps of the flow diagrams of FIGS. 9, 12 and 13) may be described as executed by real-time service processor 418 (FIG. 4) for clarity of illustration, it will be understood that any of these processes or portions of these processes may be performed by any device or group of devices configured to do so; for example, special- or general-purpose processing circuitry located within media guidance data source 368 (FIG. 3A), client device 300 (FIG. 3B) or any appropriately-configured component of catalog and recommendation system 400 (FIG. 4) or service process or 500 (FIG. 5). In some implementations, these processes are performed by multiple processing devices operating in series, in parallel, or a combination. Additionally, although the steps of flow diagram 600 may be described with reference to a user's preferences (a user being a special case of a client), this is simply for ease of illustration. The steps of flow diagram 600 may be performed with reference to the preferences of a general client, which may serve one or more users.

At step 602, real-time service processor 418 initializes a preference state, which includes a preference value for each content element monitored by real-time service processor 418. The preference value for a content element represents a confidence in a user's expected preference for that element. The preference state may also include values that represent a user's preference for combinations of two or more elements (e.g., the likelihood that a user simultaneously prefers two movies, or prefers one movie and doesn't prefer another movie). A preference state value that represents a user's preference for a combination of n elements is referred to herein as an n-element preference value. For example, a preference value representing a user's preference for two books is referred to as a 2-element preference value. In some embodiments, an n-element preference value is a binary value, with "1" representing that the user prefers the underlying combination of content elements, and "0" representing that the user does not prefer the combination. In some embodiments, an n-element preference value is a continuous or discrete value drawn from a range of values. For example, an n-element preference value may represent a probability that a user prefers the underlying combination of content elements. In this example, each n-element preference value may have a value in the range [0,1]. In some embodiments, real-time service processor 418 determines n-element preference values by using m-element preference values, where m is less than n. For example, real-time service processor 418 may determine 3-element preference values at step 610 by combining 1-element preference values and 2-element preference values. One such embodiment of step 610 is described in detail with reference to the exemplary embodiment of the process of FIG. 6 described below.

In some embodiments, real-time service processor 418 initializes the preference state with information provided by human editors, who evaluate an initial set of content elements (e.g., assets and categories related to the assets) on a scale of zero to one, with zero representing a content element that a user is unlikely to prefer and one representing a content element that a user will certainly prefer. In some embodiments, real-time service processor 418 initializes the preference state by analyzing data representative of previous consumption of or preference for different content elements (e.g., download frequency, sales, positive reviews, number of times an element has been referred to in a tweet, number of times an element has been liked on Facebook, etc.). This data may be transmitted electronically to real-time service processor 418 (e.g., via input 438) or may be gathered by catalog and recommendation system 400 by analyzing data regarding previous events stored, for example, in event database 436 or profiles database 426 (FIG. 4). In some embodiments, real-time service processor 418 uses multiple techniques for initializing the preference state for a single content element, (e.g., computing the average of two sales figures and scaling that average against a scale representing maximum and minimum sales value) or uses different techniques for different content elements (e.g., tweets for a website and downloads for an e-book). These embodiments may be particularly advantageous when content element information is derived from multiple sources, each of which may quantify the "popularity" of a particular content element in a different way.

At step 604, real-time service processor 418 retrieves an event record from event database 456 (FIG. 4). An event record may consist of information about an activity (referred to as the "event activity") and information about an associated content element (referred to as the "event element"). Examples of event activities and content elements are given above and throughout this disclosure. Event records may be assembled and stored internally to catalog and recommendation system 400 in event database 436, or may be provided to catalog and recommendation system 400 by an external event record system (e.g., via input 438 or path 440). In some embodiments, catalog and recommendation system 400 receives multiple different kinds of event records from multiple external sources, and processes these event records into a consistent format (e.g., using SQL or another relational database language). In some embodiments, real-time service processor 418 performs step 604 in near real-time (with the event record retrieved in response to or shortly after the occurrence of the event). In some embodiments, real-time service processor 418 retrieves an event record at step 604 from a queue of event records in event database 436; in such embodiments, step 604 may be performed when the number of event records in the queue exceeds a threshold number, or when sufficient processing power is available to process the event record for example. Real-time service processor 418 may not process queued event records in a linear order, and may instead process records representing more significant events before records representing less significant events. For example, a user purchase of an album by the band Slayer may be more indicative of the user's preference for the band Slayer than a user viewing of a Slayer video on a free online video service and thus real-time service processor 418 may process the event record associated with the purchase before the event record associated with the viewing, even if the viewing took place before the purchase.

At step 606, real-time service processor 418 selects a content element from an index of content elements stored, e.g., with profiles database 426. Although the event record retrieved at step 604 is associated with an event element (as discussed above), an event may provide information about content elements other than the event element. For example, a user who purchases (an event activity) an album by the band Slayer (the event element associated with the event activity) indicates a preference for the band Slayer, but may also indicate a preference for the genre of Death Metal (another content element because the band Slayer may be said to belong to the genre of Death Metal). The recommendation techniques described herein allow information from an event associated with an event element to influence predicted preference values for content elements besides the event element. Thus, at step 606, real-time service processor 418 selects a content element that may or may not be the event element of the event record returned at step 604, and may instead be the first (or other) content element in a database of content elements. In some embodiments, the set of content elements from which a content element is selected at step 606 may depend on the event element. For example, real-time service processor 418 may be configured to "assume" that there is no correlation between a preference for Death Metal and a preference for Contemporary Opera, and thus when an event record is returned at step 604 with Death Metal as its event element, real-time service processor 418 will not select Contemporary Opera as the content element at step 606. Such embodiments may require less computational power (since relationships that are presumptively zero need not be considered), but at the risk of not detecting or adequately characterizing a relationship between two content elements whose non-zero relationship may not be obvious to the administrators of catalog and recommendation system 400. After a content element is selected at step 606, steps 608-614 are performed with respect to the selected content element as described below.

At step 608, real-time service processor 418 retrieves one or more event-element factors from a storage device, such as profiles database 426 (FIG. 4). An event-element factor represents the relationship between a user's preference for the selected content element and the event whose record was returned at step 604. Event-element factors may come in two varieties: positive event-element factors which represent the tendency of a user who prefers the content element to give rise to the event, and negative event-element factors which represent the tendency of a user who does not prefer the content element to give rise to the event. Event-element factors may be set using any of the techniques described above with reference to initializing the preference state at step 602 (e.g., by human editors, by analyzing data representative of joint likelihoods of events and elements such as purchase or download data, etc.).

At step 610, real-time service processor 418 updates the preference value for the content element selected at step 606. To determine the current preference value, real-time service processor 418 may query one or more internal variables or may query other devices in communication with catalog and recommendation system 400 that are configured to store current preference values, such as profiles database 426. In an embodiment, real-time service processor 418 maintains a record of the current preference values as a state variable in a memory (e.g., an external or remote memory). For example, if real-time service processor 418 is configured to maintain preference values for eight different content elements, a memory array of 8 elements may be used to store the current preference state. Real-time service processor 418 may update the preference value at step 610 in any of a number of ways. In some embodiments, real-time service processor 418 calculates an updated preference value by multiplying the current preference value by the corresponding event-element factor. For example, if the event is the purchase of a Slayer album, and the content element under consideration is the genre of Contemporary Opera, the current 1-element preference value may be updated by multiplying by the event-element factor that relates the purchase of a Slayer album to a preference for Contemporary Opera. In some embodiments, real-time service processor 418 calculates an updated preference value by multiplying the current preference value by the 2-element preference value that relates the content element of interest to the event element. In some embodiments, real-time service processor 418 calculates an updated preference value by multiplying the current preference value by the 2-element preference value that relates the content element of interest to the event element, then multiplying the result by the event-element factor that relates the event activity to the event element. Another exemplary embodiment of step 610 is discussed in detail below.

At step 612, real-time service processor 418 determines whether the preference values of all content elements has been updated. If not, real-time service processor 418 returns to step 606 to select a next content element. If real-time service processor 418 determines at step 612 that the preference values for all content elements have been updated, after all content elements are updated in this fashion, real-time service processor 418 may normalize the preference state (e.g., linearly scaled so that the maximum preference value has a numerical value of one, or non-linearly scaled so that the preference values span the range [0,1]). Real-time service processor 418 may then return to step 604 to retrieve a next event record and may reiterate the remaining steps of flow diagram 600 using this event record.

An exemplary embodiment of a preference updating process in accordance with flow diagram 600 of FIG. 6 is now described. This embodiment includes advantageous modifications of some of the tools of Bayesian statistics to improve the preference updating process. In this embodiment, at step 602, real-time service processor 418 initializes the preference state with both 1-element preference values and 2-element preference values. In the following discussion, L denotes a content element, P(L) denotes the 1-element preference value for the content element h, and $P(L_1 \cap L_2)$ denotes the 2-element preference value for the two content elements $L_1$ and $L_2$. In this embodiment, P(L) represents the probability that a user prefers content element L, and $P(L_1 \cap L_2)$ represents the probability that a user prefers both content elements $L_1$ and $L_2$. The preference values can be initialized at step 602 using any of the techniques described above (e.g., manual entry by an administrator based on prior consumption data). The initial preference values are denoted by $P_0$, and the values determined after the kth event record (denoted $E_k$) has been received and processed are denoted by $P_k$. The preference state after the event record t has been received and processed is denoted by:

$$S_t = \begin{cases} P_t(L_i) \\ P_t(L_i \cap L_j) \end{cases} \text{ for all distinct } i, j \in [1, n]. \quad (1)$$

In this embodiment, an event record received at step 604 is denoted by E, and includes an event activity A and an event element T. An event record with multiple event elements may be treated as multiple events with the same action and different event elements. The event-element factor (step 606) that relates an event E with a content element L is denoted by P(E|L), which represents the conditional probability that a user who prefers content element L will give rise to event E. In this embodiment, these event-element factors are constant, and stored in memory associated with real-time service processor 418 (e.g., profiles database 426 of FIG. 4) by administrators based on prior consumption data (but may be determined or approximated by an automated system based on any preference-related information).

At step 610, real-time service processor 418 updates the preference values according to the following rule (based on Bayesian statistics):

$$P_{t+1}(L_i) = P_T(L_i | E_t) \quad (2)$$

Applying Bayes' theorem, Eq. 2 may be rewritten as:

$$= \frac{P_t(E | L_i) P_t(L_i)}{P_t(E)}, \quad (3)$$

and further expanded using the law of total probability as:

$$= \frac{P_t(E | L_i) P_t(L_i)}{\alpha_E P_t(L_E) + \beta_E (1 - P_t(L_E))}. \quad (4)$$

In order to express $P_t(E|L_i)$ in terms of $P(E|L_E)$, this embodiment employs an approximation: that E and L, are conditionally independent given $L_E$. That is, if a user is known to prefer $L_E$, the likelihood that the event E will occur is unaffected by whether or not the user prefers another content element $L_i$. This approximation allows Eq. 4 to be rewritten as follows, using the law of total probability and the traditional definition of conditional probability:

$$= \frac{\alpha(P_t(L_E \cap L_i)) + \beta(1 - P_t(L_E \cap L_i))}{P_t(L_i)} \quad (5)$$

Using the expression of Eq. 5 allows real-time service processor 418 to calculate $P_{t+1}(L_1)$ (the 1-element preference state update) in terms of known quantities. Because the preference state also includes 2-element values, real-time service processor 418 must also determine $$P_{t+1}(L_i \cap L_j) = P_t(L_i \cap L_j | E) \quad (6)$$

Applying Bayes' theorem, Eq. 6 can be expressed as:

$$= \frac{P_t(E | L_i \cap L_j) P_t(L_i \cap L_j)}{\alpha_E P_t(L_E) + \beta_E (1 - P_t(L_E))} \quad (7)$$

where $$P_t(E|L_i \cap L_j) = \alpha(P_t(L_E|L_i \cap L_j)) + \beta(1 - P_t(L_E|L_i \cap L_j)) \quad (8)$$

At this stage, real-time service processor 418 employs a second approximation for $P_t(L_E \cap L_i \cap L_j)$, which includes two separate cases. In the case where two of $L_a$, $L_b$, and $L_c$ are independent, then real-time service processor 418 operates according to the assumption that they will continue to be independent in the event of $L_z$, and thus:

$$P_t(L_x \cap L_y \cap L_z) = P_t(L_x \cap L_y | L_z) P_t(L_z) = \frac{P_t(L_x \cap L_z) P_t(L_y \cap L_z)}{P(L_z)} \quad (9)$$

If no two of $L_a$, $L_b$, and $L_a$ are independent, real-time service processor 418 selects the smallest of the three intersections of two content elements ($P_t(L_a \cap L_b)$, $P_t(L_b \cap L_c)$, $P_t(L_a \cap L_c)$), since $P_t(L_a \cap L_b \cap L_c)$ cannot be greater than the smallest of these. If $L_x$ and $L_y$ denote the two selected, and $L_z$ the other, real-time service processor 418 approximates the ratio of $P_t(L_x \cap L_y \cap L_z)$ to $P_t(L_x \cap L_y)$ based on the ratios of $P_t(L_x \cap L_z)$ to $P_t(L_x)$ and $P_t(L_y \cap L_z)$ to $P_t(L_y)$, in accordance with $$P_t(L_x \cap L_y \cap L_z) = P_t(L_x \cap L_y) \frac{P_t(L_x \cap L_z) + P_t(L_y \cap L_z)}{P_t(L_x) + P_t(L_y)} \quad (10)$$

Thus, in this embodiment, real-time service processor 418 executes step 610 of the preference updating process of FIG. 6 by updating the 1-element preference state according to the expression of Eq. 5, and the 2-element preference state according to the expressions of Eqs. 8-10.

Figure 7:
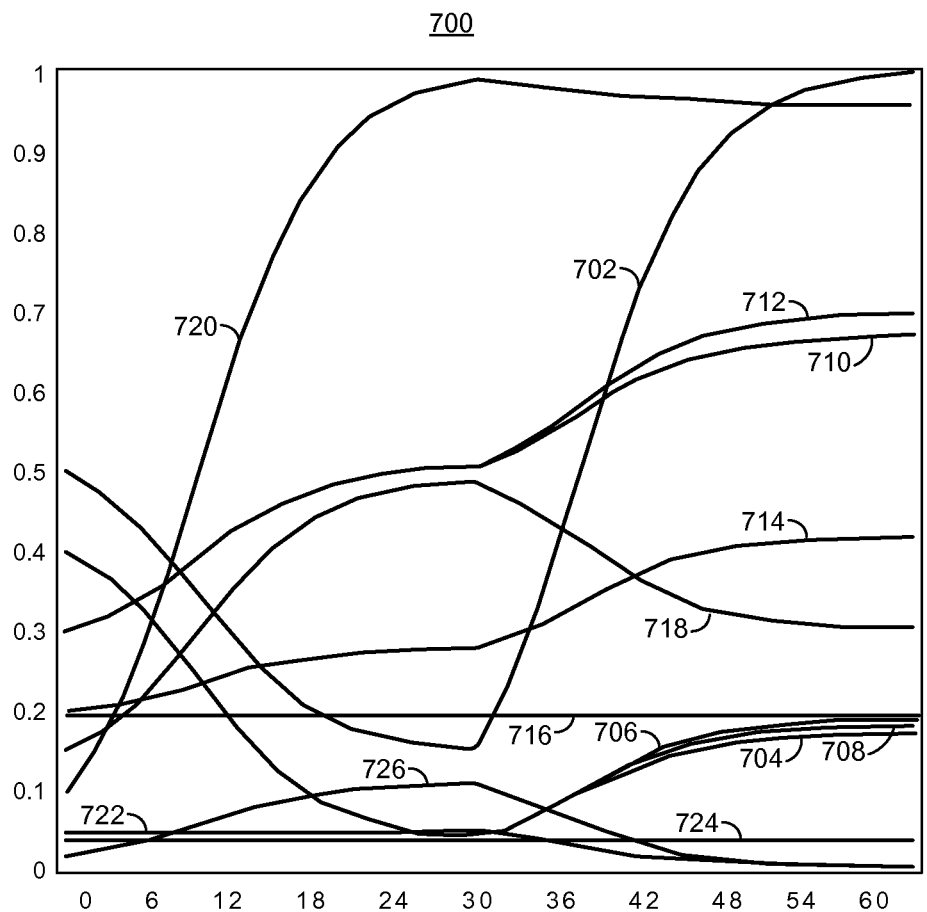
FIG. 7 is a graph of illustrative preference values determined in accordance with the preference updating process of FIG. 6.

FIG. 7 is a graph of illustrative preference values determined by real-time service processor 418 in accordance with the exemplary embodiment of the preference updating process of FIG. 6 just discussed. In particular, FIG. 7 depicts a user's 1-element preference values for 13 different content elements corresponding to different musical genres: mainstream pop rock 702, contemporary pop 704, contemporary R&B 706, adult contemporary 708, pop-emo 710, commercial indie pop 712, alternative folk 714, jazz standards 716, emo-core 718, hardcore punk 720, death metal 722, ambient noise 724, and noise 726. The initial 1-element preference values (programmed into real-time service processor 418 before information about the user was available) are indicated at the left side of graph 700 (i.e., at time 0). Real-time service processor 418 received thirty event records in a row, each record indicating that a user selected a hardcore punk song to listen to via an online music service (i.e., times 1-30). In response, the preference value for the "hardcore punk" content element 720 increased. At the same time, the preference value for the "mainstream pop rock" content element 702 decreased. Though none of the first thirty event records were directly associated with "mainstream pop rock," real-time service processor 418 inferred this change in preference based on a relationship between the event record and the "mainstream pop" content element (e.g., using the event-element factors determined at step 608 and/or multiple-element preference values). From time 30 to time 60, real-time service processor 418 received thirty event records in a row, each record indicating that the user selected a mainstream rock song to listen to via an online music service. As a result, real-time service processor 418 began to increase the preference value for the "mainstream pop rock" content element.

The preference updating technique of FIG. 6, as well as the other recommendation techniques described herein, may be used to provide recommendation data that may be used in a variety of settings. For example, as described above, recommendation data may be used with a media guidance application executed on a user's set-top box, recording device, personal computer, handheld computing device, or any other client device (e.g., these described above with reference to client device 300 of FIG. 3B). A media guidance application using this recommendation data may also be executed by a web server, which may deliver displays including recommendation data to client derives using a communications network. Exemplary displays and applications (e.g., advertisements, assts, channels) were descried above with references to FIGS. 1-2, but the recommendation data provided by the systems and techniques disclosed herein may be used in any number of settings in which personalized or otherwise targeted data is desired.

Discussed above are techniques for quantifying and updating a user's predicted preferences for different content elements. However, before making a recommendation for a particular content element, the recommendation systems described herein may also advantageously consider how polarizing that content element may be. As discussed above, highly polarizing content element tends to elect strong reaction in users—they either "love it" or "hate it." A less-polarizing content element tends not to elicit strong reactions, though different users may prefer or not prefer it. The systems and methods disclosed herein may use information about how polarizing a content element is to determine what recommendations to provide to client devices. For example, new clients accessing catalog and recommendation system 400 for the first time may be provided with recommendations for less polarizing content (e.g., via a media guidance application that provides a display like any of FIGS. 1 and 2) for a predetermined period of time or number of accesses, or until catalog and recommendation system 400 has obtained a threshold amount of client-specific data (e.g., in the form of events that can be used in the preference determination process of FIG. 6). In some implementations, catalog and recommendation system 400 may provide recommendations for highly polarizing content upon determining that a client is particularly interested in such content (e.g., by correlating the client's preferences with polarity scores, or by receiving polarity-specific information as described below with reference to FIG. 10). Polarity information may be used in any of a number of additional applications in which controversial or non-controversial recommendations are preferred. For example, polarity information may be used to select a content element to populate a "survey" feature in a media guidance application that elicits user inputs as to how much they like or dislike a given content element (in which case highly polarizing content elements may elicit greater participation in the survey).

Figure 8A:
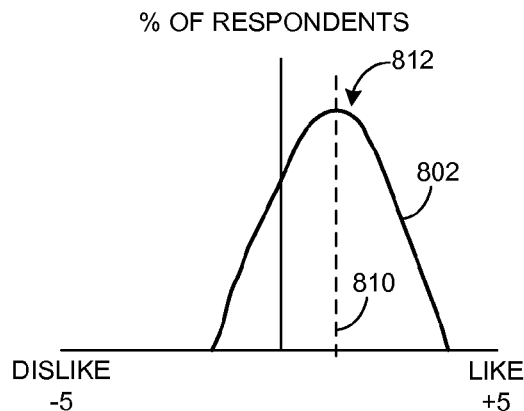
FIGS. 8A-8D depict illustrative preference value distributions associated with different polarity scores.
Figure 8B:
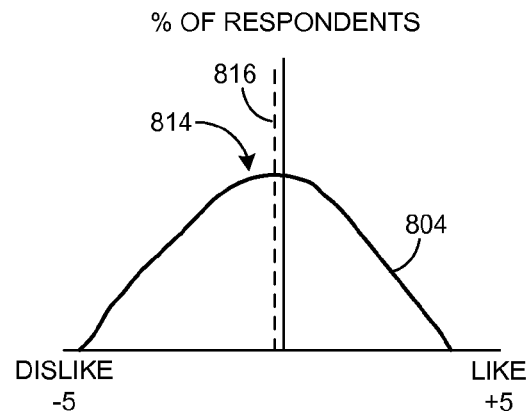

The systems and methods described herein may quantify how polarizing a content element is by determining a polarity score associated with that asset. In some implementations, a polarity score represents the amount by which the distribution of preferences for a content element, accumulated over multiple clients or other sources, differs from the average preference for that content element. A polarity score may further represent how concentrated preferences are around two or more values. This concept is illustrated in FIGS. 8A-8D, which depict four different preference distributions 802, 804, 806 and 808. The preference distributions of FIGS. 8A-8D are represent the percentage of respondents (e.g., takers of a survey, reviewers of a book, viewers of a video-on-demand, etc.) that assigned a particular preference score to a given content element (e.g., an actor, a genre, a film, etc.). In FIGS. 8A-8D, the preference scores are distributed on a scale that runs between a left end point of −5 (representing a strong dislike of the content element) and a right end point of +5 (representing a strong liking of the content element), but this scale is simply illustrative and any numerical or non-numerical scale (e.g., a grading system like A-F, or a number of stars) may be used. In FIG. 8A, the average preference value of distribution 802 is indicated by vertical line 810, and it is clear that single peak 812 of distribution 802 roughly coincides with average 810. Thus, in distribution 802, most preference values occur on or around average 810, and thus distribution 802 may have a relatively low polarity score. In FIG. 8B, distribution 804 also has single peak 814 that roughly coincides with average 816, but distribution 804 is wider than distribution 802, indicating that there are more respondents who felt more strongly about the content element (either liking or disliking) than in distribution 802 of FIG. 8A. Thus, distribution 804 of FIG. 8B may have a higher polarity score than distribution 802 of FIG. 8B, though still only one peak 814.

Figure 8C:
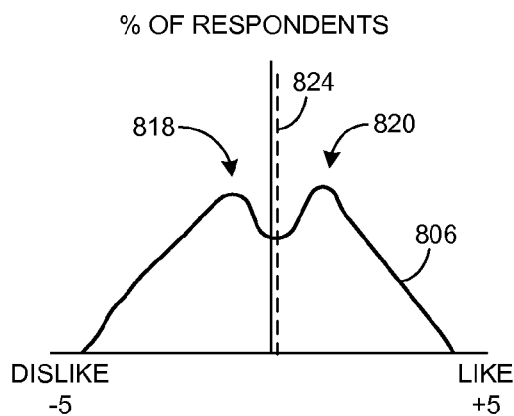
Figure 8D:
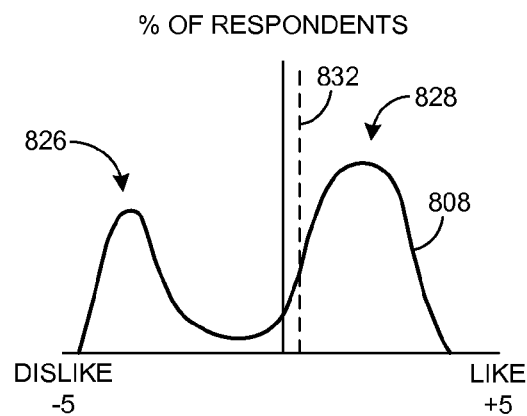

FIG. 8C, on the other hand, depicts distribution 806 which has two peaks 818 and 820. Peak 818 falls on the "dislike" side of the scale and peak 820 falls on the "like" side of the scale, with average 824 in between. Even though distribution 806 of FIG. 8C appears to reach maximum and minimum like-dislike scale values that are approximately the same as distribution 804 of FIG. 8B (i.e., the two distributions are equally "wide"), distribution 806 has two distinct peaks on either side of mean 804, indicating that more of preference values for this content element differ from mean 804 than in distribution 804 of FIG. 8B. Thus, distribution 806 of FIG. 8C may have a higher polarity score than distribution 804 of FIG. 8B. An even higher polarity score may be associated with distribution 808 of FIG. 8D, which also has two peaks 826 and 828 and mean 832 in between, but which also has greater concentration of distribution 808 clustered around the peaks 826 and 828 than distribution 806 of FIG. 8C. In other words, a preference value randomly selected from distribution 808 of FIG. 8D is more likely to be close to one of peaks 826 and 828 than a preference value randomly selected from distribution 806 of FIG. 8C is to be close to one of peaks 818 and 820, and thus distribution 808 of FIG. 8D represents a content element with a higher polarity score than distribution 806 of FIG. 8C.

The systems and methods described herein may determine polarity scores in any of a number of ways. In some implementations, polarity scores for content elements are input into catalog and recommendation system 400 (FIG. 4) by human administrators (e.g., via editorial influence module 410). An administrator-facing graphical user interface may be provided to receive such inputs. In illustrative administration-facing display 900 of FIG. 9, an administrator is able to enter values for a number of fields 1102. The administrator may manually enter these values, select the values from a drop-down menu, or have some of the values (e.g., content element 908, type 910 and domain 912) automatically filled in when the administrator selects a content element via display 900 or beforehand. The administrator is allowed to set a polarity score for a content element in two ways: by selecting a point on a spectrum between "not polarizing" and "polarizing" (as illustrated by display element 904) or by entering a numerical value (e.g., between 0 and 1, as discussed above and as illustrated by display element 906). In some embodiments, real-time service processor 418 may automatically fill in a recommended polarity score in display 900 (using, for example, any of the polarity scoring techniques discussed above) and the administrator may adjust or accept the recommended score.

In some implementations, one or more processors of catalog and recommendation system 400 (e.g., data mining processor 412 or real-time service processor 418) may determine a polarity score associated with a content element based on a distribution of preference values for that element. The preference values used in this determination may be the same preference values used in the preference updating process of FIG. 6, or may be other indicators of preference for or against certain content elements, as described above (e.g., user ratings of the content element). The preference values used to determine polarity scores may come from a particular client or group of clients, and the resulting polarity scores may be used for that particular client or group of clients only. For example, real-time service processor 418 may aggregate preference values from each user in a group of users (e.g., all users of catalog and recommendation system 400, or a subset of users similar to a user of interest), then compute a summary statistic of the distribution of preference values that is indicative of the polarity of the distribution (as described in more detail below). In some embodiments, the polarity score is represented by a binary value, with "1" indicating that the content element is polarizing and "0" indicating that the content element is non-polarizing. In some embodiments, the polarity score is a continuous or discrete value drawn from a range of values (e.g., the range [0,1]).

Data mining processor 412 or real-time service processor 418 may determine a polarity score by applying one or more polarity characterization techniques to a distribution of preference values, such as the techniques listed below. These techniques are merely exemplary, and any technique may be used that results in a score that is indicative of the amount by which a set of preference values differs from an average preference value (and in some embodiments, the degree to which the set of preference values is concentrated around two or more different values).

1. Determine the average positive (i.e., "liking") preference value and the average negative (i.e., dislike) preference value, and set the polarity score equal to the difference between them.

2. Determine the variance of the distribution of preference values, and set the polarity score equal to the variance.
3. Determine whether the distribution of preference values has more than one peak; if so, set the polarity score equal to a predetermined value (e.g., "1"), and if not, set the polarity score equal to a different predetermined value (e.g., "0"). This technique may also include smoothing the distribution prior to determining the number of peaks (e.g., using an interpolation function or a moving average or filter).
4. Determine the total number of possible preference values (e.g., five if the preference values can take the values −2, −1, 0, 1 and 2), determine the percentage of the total number of preference values equal to a particular value, and calculate the polarity score in accordance with $$\sum_{i=1}^{n}\sum_{j=1}^{n}\pi_i^{1+\alpha}\pi_j|v_i-v_j| \quad (11)$$

where n is the total number of possible preference values, $\pi_i$ is the percentage of the total number of preference values equal to value $v_i$, and $\alpha$ is a non-negative, predetermined constant that adjusts how the concentration of preference values around peaks affects the polarity score.
5. Determine the total number of possible preference values, determine the percentage of the total number of preference values equal to a particular value, determine the average preference value and calculate the polarity score in accordance with $$\sum_{j=1}^{n}\pi_i\left|\frac{v_i-a}{a}\right|^r \quad (12)$$

where n is the total number of possible preference values, $\pi_i$ is the percentage of the total number of preference values equal to value $v_i$, a is the average preference value, and r is a value between 0 and 1 that adjusts how the distance of the distribution from the average value affects the polarity score.
6. Compare the preference value distribution to a non-polarized distribution (e.g., a distribution like distribution 802 of FIG. 8A), compare the preference value distribution to a more-polarized distribution (e.g., a distribution like distribution 808 of FIG. 8D), and determine whether the preference value distribution is more similar to the non-polarized or more-polarized distribution; if more similar to the non-polarized distribution, set the polarity score equal to a predetermined value (e.g., "0"), and if more similar to the more-polarized distribution, set the polarity score equal to a different predetermined value (e.g., "1"). The comparison of distributions may be performed using any pattern matching or curve comparison technique, such as calculating the mean-square difference between the distributions.

Figure 10:
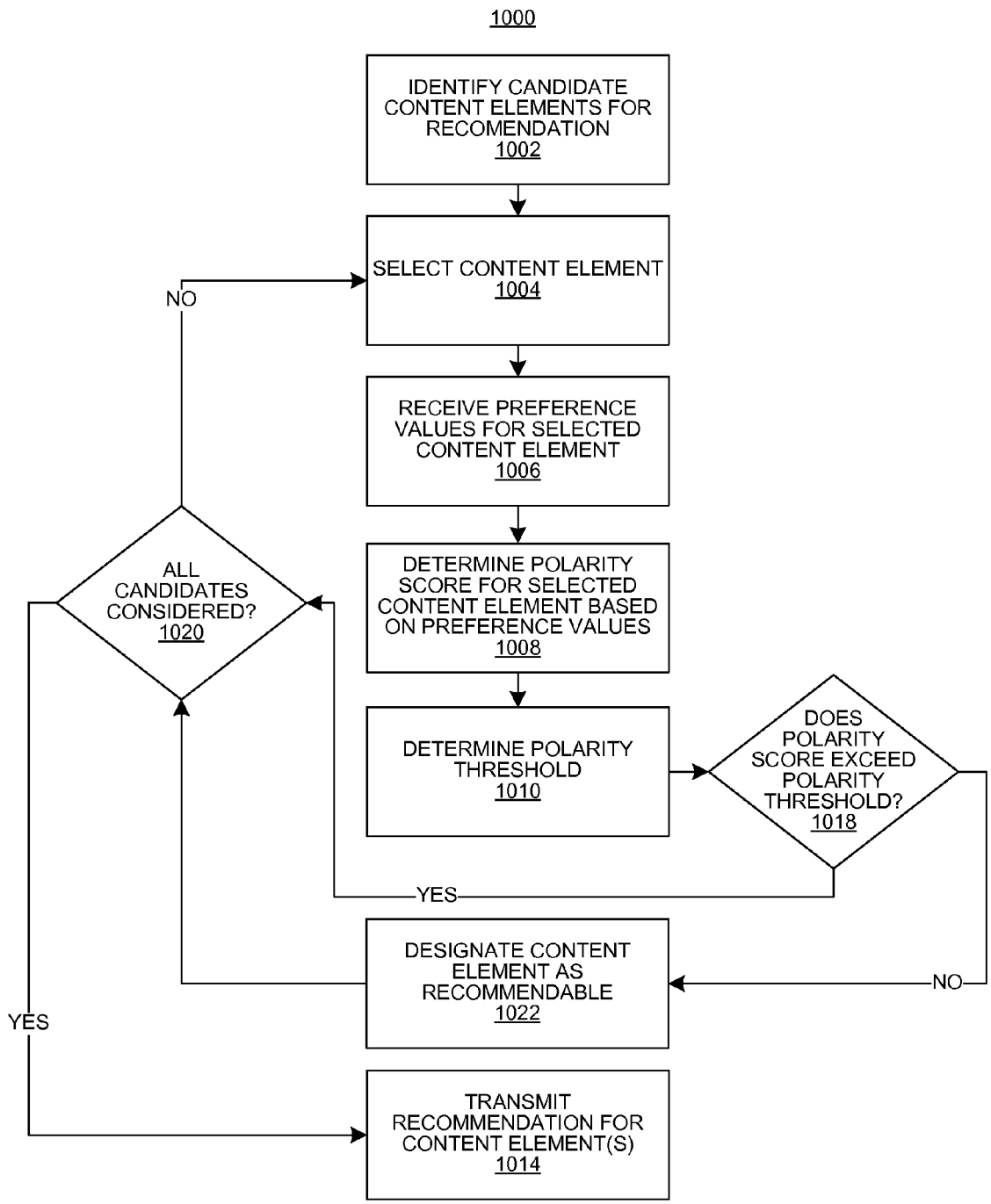
FIG. 10 is a flow diagram of a process for providing content recommendations based on polarity scores.

Systems and methods for using polarity scores to determine what recommendations to provide to client devices are now described in additional detail. FIG. 10 is a flow diagram of a process for providing content recommendations based on polarity scores.

At step 1002, real-time service processor 418 identifies a set of candidate content elements that will be considered for recommending to a client device. Content elements are described in detail above, and throughout this disclosure. The set of content elements identified at step 1002 may include all of the content elements managed by real-time service processor 418, or only some of the content elements (e.g., those belonging to a particular media domain or genre requested by a client device, those corresponding to content created within the last month or year, etc.). In some embodiments, the set of content elements identified at step 1002 includes only those content elements for which polarity scores are available. A content elements may not have an associated polarity scores because no scores has yet been computed, or because not enough preference value data is available to compute a polarity score with sufficient confidence or accuracy.

At step 1004, real-time service processor 418 begins evaluating each of the candidate content elements identified at step 1002 by selecting one of the content elements (e.g., the first content element in an ordered list of the candidate content elements). At step 1006, real-time service processor 418 receives preference value information for the content element selected at step 1004. This preference value information may take the form of a histogram of preference values, one or more summary statistics of the distribution of preference values (e.g., the variance or average positive or negative values as described above), or any other form of information that real-time service processor 418 can use to determine a polarity score. At step 1008, real-time service processor 418 determines a polarity score associated with the content element selected at step 1004. A detailed description of polarity scores and many examples of scoring techniques are given above. In some implementations, the polarity score determined at step 1008 may be based on the preference value information received at step 1008. In some implementations, the polarity score determined at step 1008 may be manually set by a human administrator (e.g., via editorial influence module 410 of FIG. 4), and thus real-time service processor 418 may not use the preference value information received at step 1004 (in which case that step may be omitted).

At step 1010, real-time service processor 418 determines a polarity threshold against which to evaluate the polarity score determined at step 1008. In some embodiments, real-time service processor 418 will not recommend content elements with polarity scores that exceed the polarity threshold, may reduce the likelihood that those content elements will be recommended (as described in detail below with reference to FIG. 13) or may recommend those content elements separately (e.g., via a "Take a Chance" navigation element or area in display 200 of FIG. 2, not shown). The polarity threshold may be a fixed value used for all content elements and all clients or may vary by client, by users associated with clients, by media domain (e.g., music, movies), over time, or any combination. In some implementations, the polarity threshold of step 1010 depends on the polarity scores determined for each of the candidate content elements. For example, the polarity threshold used at step 1010 may be the minimum polarity score of the polarity scores determined for each of the candidate content elements identified at step 1002. In such implementations, the order of the steps of the flow diagram of FIG. 10 may be rearranged so that polarity scores are calculated for each candidate content element before the polarity threshold is set and any comparisons to that threshold are made.

In some implementations, the polarity threshold is manually set by an administrator (e.g., via editorial influence module 410 or profiles database 426 of FIG. 4). In some implementations, real-time service processor 418 determines the polarity threshold based on the preference values for the selected content element or for a group of content elements that does or does not include the selected content element. For example, real-time service processor 418 may set the polarity threshold at one standard deviation below the average preference value for all content elements within the same media domain as the selected content element, or at one standard deviation below the average preference value for the content elements that are the most often recommended by catalog and recommendation system 400. In some embodiments, real-time service processor 418 determines the polarity threshold at step 1010 based on a client's (e.g., a user's) interest in and tolerance for polarizing content. For example, real-time service processor 418 may determine a client's (e.g., a user's) interest in polarizing content by analyzing previous events associated with the client (e.g., how often the client purchases, downloads, or gives a thumbs-up to polarizing content, or by setting the polarity threshold based on the average, median or mode of polarity scores of content that the client is known to prefer). In some embodiments, device gateway 434 (FIG. 4) solicits input from a client via client devices 374 (FIG. 3A) regarding the client's interest in polarizing content elements. In illustrative display 1100 of FIG. 11, which may be displayed on display 310 of client device 300 (FIG. 3B), a client is presented with a set of polarity questions 1102 after the client has selected the "Your Profile" navigation element 1104. Each of the polarity questions in display 1100 elicits a response from the client that may indicate the client's interest in or tolerance for polarizing content. Real-time service processor 418 may score the client's response to each of the polarity questions 1102 (e.g., with a 1 indicating little interest in or tolerance for polarizing content and a 5 indicating a lot of interest in or tolerance for polarizing content) and may average or otherwise compile the scores to develop a polarity threshold for use at step 1010, or other characterization of the client's polarity preferences for use in making contemporaneous or future recommendations.

Returning to the flow diagram of FIG. 10, at step 1018, real-time service processor 418 compares the polarity score determined at step 1008 to the polarity threshold determined at step 1010 to determine whether the polarity score exceeds the polarity threshold. If yes, real-time service processor 418 may not provide a recommendation for the content element at this time, and may proceed to step 1020 to determine whether there are other candidate content elements that may be recommendable, and if so, real-time service processor 418 proceeds to step 1004 to select another content element. If real-time service processor 418 determines at step 1018 that the polarity score determined at step 1008 does not exceed the polarity threshold determined at step 1010, real-time service processor 418 may designate the selected content element as "recommendable" or otherwise include the selected content element in a list of content elements that will be or are likely to be recommended. Real-time service processor 418 then proceeds to step 1020 to determine whether there are other candidate content elements that may be recommendable, as described above.

Once real-time service processor 418 determines at step 1020 that all candidate content elements have been considered, real-time service processor proceeds to step 1014 and transmits a recommendation to a client device using the recommendable content elements designated at step 1022. All or only some of the recommendable content elements are recommended at step 1022. In some embodiments, real-time service processor 418 uses the polarity scores to determine the temporal or spatial order of the recommendations. For example, if catalog and recommendation system 400 determines that five content elements are to be recommended to a client device, and one of those content elements is more polarizing than the others, real-time service processor 418 may display the content element recommendations so that the more polarizing element is likely to be considered last by the client (e.g., last in a temporal sequence, or at the bottom of a display of recommended content). As described in detail above, recommendations can be transmitted to client devices in a number of ways and can be used in a number of different media guidance contexts (e.g., to populate advertisements in media guidance applications, to recommend purchases in a web-based shopping application, etc.). In some implementations, transmitting a recommendation for a content element includes transmitting metadata descriptive of that content element to a client device (e.g., album art, reviews, textual descriptions, etc.).

Figure 12:
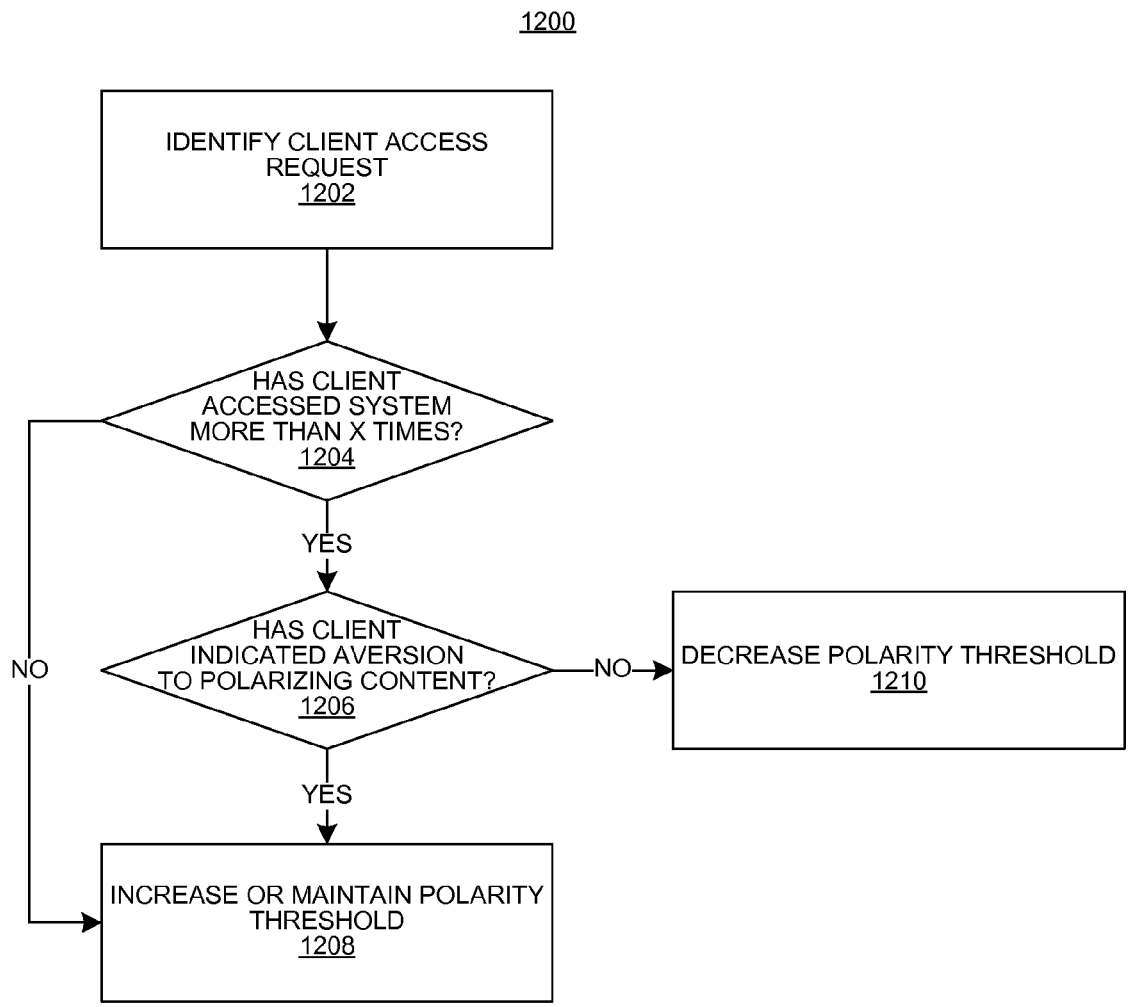
FIG. 12 is a flow diagram of a polarity threshold adjustment process.

In some embodiments, a media guidance system is configured to change the effect of polarity scores on which recommendations are provided by adjusting the polarity threshold that is used in the recommendation process of FIG. 10. FIG. 12 is a flow diagram of a polarity threshold adjustment process that may be implemented by, for example, real-time service processor 418 of FIG. 4. At step 1202, real-time service processor 418 identifies a client request for access to catalog and recommendation system 400 (e.g., a search query, a "More Like This" request, a log-in, a user profile entry, or any other request at input 440 (FIG. 4) to which recommendation data is to be provided in response). At step 1204, real-time service processor 418 determines whether the client has accessed catalog and recommendation system 400 more than a threshold number of times using one or more client devices (such as any of client devices 374 of FIG. 3A). The number of times may be counted using log-ins, searches, other requests, or any other indication of use of catalog and recommendation system 400. If the client has accessed the system more than the threshold number of times, then real-time service processor 418 proceeds to step 1206 and determines whether the client has indicated an aversion to polarizing content. This aversion may be indicated by a client on behalf of a user, for example, and may be provided in any number of ways, including those discussed above with reference to FIGS. 10 and 11. If real-time service processor 418 determines at step 1206 that the client has not indicated such an aversion, real-time service processor 418 decreases the polarity threshold at step 1210. When real-time service processor 418 uses the polarity threshold to determine which content elements are recommended (e.g., as described above with reference to the process of FIG. 10), decreasing the polarity threshold may allow more polarizing content elements to be recommended by catalog and recommendation system 400. If real-time service processor 418 determines at step 1206 that a client has indicated an aversion to polarizing content at step 1206, or if real-time service processor 418 determines that the client has not accessed catalog and recommendation system 400 more than the threshold number of times at step 1204, real-time service processor 418 increases or maintains the polarity threshold at its previous value at step 1208. Increasing the polarity threshold at step 1208 may reduce the likelihood that polarizing content elements are recommended by catalog and recommendation system 400.

The amount by which real-time service processor 418 decreases the polarity threshold at step 1210, or increases the polarity threshold at step 1208, may be adjusted by administrators of catalog and recommendation system 400 depending on how the polarity threshold is used and the needs and desires of particular clients. These amounts may also vary by information about particular users or clients stored in profiles database 426 (FIG. 4) (e.g., an older user, or client service directed to older users, may have polarity thresholds decrease more slowly that a younger user).

In some implementations, polarity scores may be taken into account during preference value initialization and updating processes. For example, real-time service processor 418 may use the polarity scores to initialize the preference state at step 602 of the preference updating process of FIG. 6 by using polarity to adjust base preference values to determine the initial preference values. Each base preference value may represent some aspect of the distribution of preferences for the corresponding content element, such as the average value or the most common value. Polarity scores may then be used to adjust these base preference values up or down, depending on the application, to arrive at an initial preference value that may be used to provide recommendations (e.g., according to the preference updating process of FIG. 6).

Figure 13:
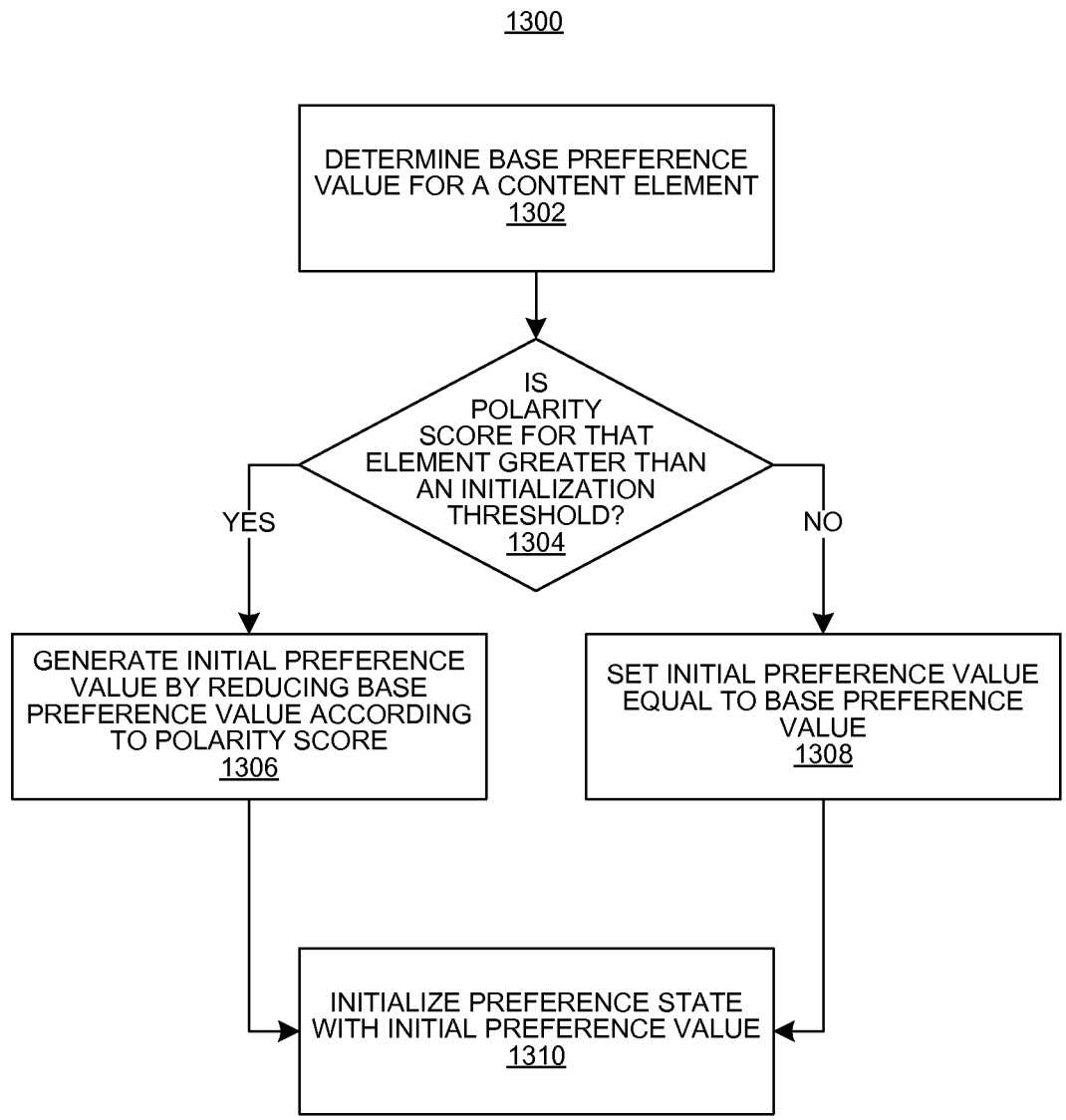
FIG. 13 is a flow diagram of a process for initializing preference values by adjusting base preference values according to polarity scores.

FIG. 13 is a flow diagram of a process for initializing preference values by adjusting base preference values according to polarity scores. At step 1302, real-time service processor 418 determines a base preference value for a content element. The base preference values determined at step 1302 may be determined in accordance with the preference state initialization techniques described above with reference to step 502 of FIG. 6 (e.g., based on consumption data or manually entered by an administrator). However, in the process of FIG. 13, the base preference values are not immediately used to initialize the preference state; instead, in the remaining steps, real-time service processor 418 uses the base preference values and the polarity scores to determine the preference values that will be used to initialize the preference state at step 602 of FIG. 6. At step 1304, real-time service processor 418 determines whether the polarity score associated with the content element is greater than an initialization threshold. The initialization threshold used at step 1304 may be determined in any of the ways described above with reference to determining the polarity threshold at step 1010 of FIG. 10, including being manually set by an administrator or automatically set, for example, at one standard deviation below the average polarity score for all content elements.

If real-time service processor 418 determines that the polarity score is not greater than the initialization threshold at step 1304, real-time service processor 418 sets the initial preference value for that content element equal to the base preference value at step 1308. In some implementations, instead of setting the initial preference value equal to the base preference value, real-time service processor 418 increases the base preference value to generate the initial preference value, which may increase the likelihood that the content element will be part of a recommendation. If real-time service processor 418 determines that the polarity score is greater than the initialization threshold at step 1304, real-time service processor 418 generates the initial preference value for the content element by reducing the base preference value at step 1306. In some implementations of step 1306, real-time service processor 418 determines initial preference scores at step 1304 by multiplying the base preference score for the content element by a function of the polarity score constructed so that the initial preference score decreases as the polarity score increases. For example, if polarity scores are defined on the interval [0,1], with "0" indicating no polarity and "1" indicating high polarity, real-time service processor 418 may generate the initial preference value at step 1306 by multiplying the base preference value by one minus the polarity score. In some implementations, real-time service processor 418 generates initial preference values for content elements whose associated polarity scores exceed an initialization threshold by reducing the base preference values by a fixed amount or percentage (e.g., reducing by 50%).

At step 1310, real-time service processor 418 uses the initial preference values determined at steps 1306 or 1308 to initialize the preference state at step 602 of the process of FIG. 6. Real-time service processor 418 may then proceed with the preference updating process of FIG. 6.

The following discussion addresses further embodiments of display screens, client devices and systems suitable for use with the asset cataloging, search, and recommendation techniques described herein. As noted above, the following discussion will often be presented in the context of media guidance applications, but it will be understood that these illustrative examples do not limit the range of interactive applications which may be improved by the use of the asset cataloging, search, and recommendation techniques of the present disclosure.

With the advent of the Internet, mobile computing, and high-speed wireless networks, users are accessing media on client devices on which they traditionally did not. As referred to herein, the phrase "client device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the client device may have a front facing screen and a rear facing screen, multiple front screens, or multiple angled screens. In some embodiments, the client device may have a front facing camera and/or a rear facing camera. On these client devices, users may be able to navigate among and locate the same content available through a television. Consequently, media guidance may be available on these devices, as well. The guidance provided may be for content available only through a television, for content available only through one or more of other types of client devices, or for content available both through a television and one or more of the other types of client devices. The media guidance applications may be provided as on-line applications (i.e., provided on a web-site), or as stand-alone applications or clients on client devices. The various devices and platforms that may implement media guidance applications are described in more detail below.

In addition to providing access to linear programming (e.g., content that is scheduled to be transmitted to a plurality of client devices at a predetermined time and is provided according to a schedule), the media guidance application also provides access to non-linear programming (e.g., content accessible to a client device at any time and is not provided according to a schedule). Non-linear programming may include content from different content sources including on-demand content (e.g., VOD), Internet content (e.g., streaming media, downloadable media, etc.), locally stored content (e.g., content stored on any client device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. The various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. Pressing an arrow key on a user input device may affect the display in a similar manner as selecting navigational icons 120.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a client device having a guidance application, in a database connected to the client, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

In an embodiment, display 200 of FIG. 2 may be augmented by any of the items and features described above for display 100 of FIG. 1. For example, advertisement 205 may take the form of any of the embodiments described above for advertisement 124. The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

As discussed above, the systems and methods of the present disclosure may be implemented in whole or in part by client 300 of FIG. 3B, which includes control circuitry 304. Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3A). In addition, communications circuitry may include circuitry that enables peer-to-peer communication of client devices, or communication of client devices in locations remote from each other (described in more detail below). Server-centric and/or peer-to-peer communication may enable the pooling of preferences and behaviors between users, for use with the systems and techniques disclosed herein.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR_), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 3A, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the client device 300. Circuitry 304 may also include digital-to-analog converter circuitry and analog-to-digital converter circuitry for converting between digital and analog signals. The tuning and encoding circuitry may be used by the client device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from client device 300, the tuning and encoding circuitry (including multiple tuners) may be associated with storage 308.

The guidance application may be implemented using any suitable architecture. For example, it may be a stand-alone application wholly implemented on client device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on client device 300 is retrieved on-demand by issuing requests to a server remote to the client device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User television equipment 352 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated into a single device, if desired. User computer equipment 354 may include a PC, a laptop, a tablet, a WebTV box, a personal computer television (PC/TV), a PC media server, a PC media center, or other user computer equipment. WEBTV is a trademark owned by Microsoft Corp. Wireless user communications device 356 may include PDAs, a mobile telephone, a portable video player, a portable music player, a portable gaming machine, or other wireless devices.

A client device utilizing at least some of the system features described above in connection with FIG. 3A may not be classified solely as user television equipment 352, user computer equipment 354, or a wireless user communications device 356. For example, user television equipment 352 may, like some user computer equipment 354, be Internet-enabled allowing for access to Internet content, while user computer equipment 354 may, like some television equipment 352, include a tuner allowing for access to television programming. The media guidance application may have the same layout on the various different types of client device or may be tailored to the display capabilities of the client device. For example, on user computer equipment 354, the guidance application may be provided as a web site accessed by a web browser. In another example, the guidance application may be scaled down for wireless user communications devices 356.

In system 350, there is typically more than one of each type of client device but only one of each is shown in FIG. 3A to avoid overcomplicating the drawing. In addition, each user may utilize more than one type of client device and also more than one of each type of client device.

In some embodiments, a client device (e.g., user television equipment 352, user computer equipment 354, wireless user communications device 356) may be referred to as a "second screen device." For example, a second screen device may supplement content presented on a first client device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one client device can change the guidance experience on another client device, regardless of whether they are the same or a different type of client device. In addition, the changes made may be based on settings input by a user, as well as user activity monitored by the guidance application.

Although communications paths are not drawn between client devices, these devices may communicate directly with each other via communication paths, such as those described above in connection with paths 358, 360, and 362, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The client devices may also communicate with each other directly through an indirect path via communications network 364.

System 350 includes content source 366 and media guidance data source 358 coupled to communications network 364 via communication paths 370 and 372, respectively. Paths 370 and 372 may include any of the communication paths described above in connection with paths 358, 360, and 362. Communications with the content source 366 and media guidance data source 358 may be exchanged over one or more communications paths, but are shown as a single path in FIG. 3A to avoid overcomplicating the drawing. In addition, there may be more than one of each of content source 366 and media guidance data source 358, but only one of each is shown in FIG. 3A to avoid overcomplicating the drawing. (The different types of each of these sources are discussed below.) If desired, content source 366 and media guidance data source 358 may be integrated as one source device. Although communications between sources 366 and 358 with client devices 352, 354, and 356 are shown as through communications network 364, in some embodiments, sources 366 and 358 may communicate directly with client devices 352, 354, and 356 via communication paths (not shown) such as those described above in connection with paths 358, 360, and 362.

Content source 366 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by ABC, Inc., and HBO is a trademark owned by Home Box Office, Inc. Content source 366 may be the originator of content (e.g., a television broadcaster, a Webcast provider, etc.) or may not be the originator of content (e.g., an on-demand content provider, an Internet provider of content of broadcast programs for downloading, etc.). Content source 366 may include cable sources, satellite providers, on-demand providers, Internet providers, over-the-top content providers, or other providers of content. Content source 366 may also include a remote media server used to store different types of content (including video content selected by a user), in a location remote from any of the client devices. Systems and methods for remote storage of content, and providing remotely stored content to client devices are discussed in greater detail in connection with Ellis et al., U.S. Pat. No. 7,761,892, issued Jul. 20, 2010, which is hereby incorporated by reference herein in its entirety.

Media guidance data source 358 may provide media guidance data, such as the media guidance data described above. Media guidance application data may be provided to the client devices using any suitable approach. In some embodiments, the guidance application may be a stand-alone interactive television program guide that receives program guide data via a data feed (e.g., a continuous feed or trickle feed). Program schedule data and other guidance data may be provided to the client device on a television channel sideband, using an in-band digital signal, using an out-of-band digital signal, or by any other suitable data transmission technique. Program schedule data and other media guidance data may be provided to client devices on multiple analog or digital television channels.

In some embodiments, guidance data from media guidance data source 358 may be provided to users' equipment using a client-server approach. For example, a client device may pull media guidance data from a server, or a server may push media guidance data to a client device. In some embodiments, a guidance application client residing on the user's equipment may initiate sessions with source 358 to obtain guidance data when needed, e.g., when the guidance data is out of date or when the client device receives a request from the user to receive data. Media guidance may be provided to the client device with any suitable frequency (e.g., continuously, daily, a user-specified period of time, a system-specified period of time, in response to a request from a client device, etc.). Media guidance data source 358 may provide, to user equipment devices 352, 354, and 356, the media guidance application itself or software updates for the media guidance application.

Media guidance applications may be, for example, stand-alone applications implemented on client devices. In some embodiments, media guidance applications may be client-server applications where only the client resides on the client device. For example, media guidance applications may be implemented partially as a client application on control circuitry 304 of client device 300 and partially on a remote server as a server application (e.g., media guidance data source 358). The guidance application displays may be generated by the media guidance data source 358 and transmitted to the client devices. The media guidance data source 358 may also transmit data for storage on the client, which then generates the guidance application displays based on instructions processed by control circuitry.

Content and/or media guidance data delivered to client devices 374, such as user equipment devices 352, 354, and 356 may be over-the-top (OTT) content. OTT content delivery allows Internet-enabled user devices, including any client device described above, to receive content that is transferred over the Internet, including any content described above. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the client device.

Media guidance data source 358 may make asset cataloging or recommendation applications available to users. Such applications may be downloaded from media guidance data source 368 to a client device, or may be accessed remotely by a user. These applications, as well as other applications, features and tools, may be provided to users on a subscription basis or may be selectively downloaded or used for an additional fee. In an embodiment, media guidance data source 368 may serve as a repository for media asset data developed by users and/or third-parties, and as a distribution source for this data and related applications.

Media guidance system 350 is intended to illustrate a number of approaches, or network configurations, by which client devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3A.

In one approach, client devices may communicate with each other within a home network. Client devices can communicate with each other directly via short-range point-to-point communication schemes described above, via indirect paths through a hub or other similar device provided on a home network, or via communications network 364. Each of the multiple individuals in a single home may operate different client devices on the home network. As a result, it may be desirable for various media guidance information or settings to be communicated between the different client devices. For example, it may be desirable for users to maintain consistent media guidance application settings on different client devices within a home network, as described in greater detail in Ellis et al., U.S. patent application Ser. No. 11/179,360, filed Jul. 11, 2005. Different types of client devices in a home network may also communicate with each other to transmit content. For example, a user may transmit content from user computer equipment to a portable video player or portable music player.

In a second approach, users may have multiple types of client devices by which they access content and obtain media guidance. For example, some users may have home networks that are accessed by in-home and mobile devices. Users may control in-home devices via a media guidance application implemented on a remote device. For example, users may access an online media guidance application on a website via a personal computer at their offices, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for client devices communicating, where the client devices are in locations remote from each other, is discussed in, for example, Ellis et al., U.S. Pat. No. 8,046,801, issued Oct. 25, 2011, which is hereby incorporated by reference herein in its entirety.

In a third approach, users of client devices inside and outside a home can use their media guidance application to communicate directly with content source 366 to access content. Specifically, within a home, users of user television equipment 352 and user computer equipment 354 may access the media guidance application to navigate among and locate desirable content. Users may also access the media guidance application outside of the home using wireless user communications devices 356 to navigate among and locate desirable content.

In a fourth approach, client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 364. These cloud resources may include one or more content sources 366 and one or more media guidance data sources 358. In addition or in the alternative, the remote computing sites may include other client devices, such as user television equipment 352, user computer equipment 354, and wireless user communications device 356. For example, the other client devices may provide access to a stored copy of a video or a streamed video. In such embodiments, client devices may operate in a peer-to-peer manner without communicating with a central server.

The cloud provides access to services, such as content storage, content sharing, or social networking services, among other examples, as well as access to any content described above, for client devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a client device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 354 or wireless user communications device 356 having content capture feature. Alternatively, the user can first transfer the content to a client device, such as user computer equipment 354. The client device storing the content uploads the content to the cloud using a data transmission service on communications network 364. In some embodiments, the client device itself is a cloud resource, and other client devices can access the content directly from the client device on which the user stored the content.

Cloud resources may be accessed by a client device using, for example, a web browser, a media guidance application, a desktop application, a mobile application, and/or any combination of access applications or the same. The client device may be a cloud client that relies on cloud computing for application delivery, or the client device may have some functionality without access to cloud resources. For example, some applications running on the client device may be cloud applications, i.e., applications delivered as a service over the Internet, while other applications may be stored and run on the client device. In some embodiments, a client device may receive content from multiple cloud resources simultaneously. For example, a client device can stream audio from one cloud resource while downloading content from a second cloud resource. Or, a client device can download content from multiple cloud resources for more efficient downloading. In some embodiments, client devices can use cloud resources for processing operations such as the processing operations performed by processing circuitry described in relation to FIGS. 3A and 3B.

It is to be understood that while the invention has been described in conjunction with the various illustrative embodiments, the forgoing description is intended to illustrate and not limit the scope of the invention. While several embodiments have been provided in the present disclosure, it should be understood that the disclosed systems, components, and methods may be embodied in many other specific forms without departing from the scope of the present disclosure.

The intention is not to be limited to the details given herein or implemented in sub-combinations with one or more other features described herein. For example, a variety of systems and methods may be implemented based on the disclosure and still fall within the scope of the invention. Also, the various features described or illustrated above may be combined or integrated in other systems or certain features may be omitted, or not implemented.

Examples of changes, substitutions, and alterations are ascertainable by one skilled in the art and could be made without departing from the scope of the information disclosed herein. Certain particular aspects, advantages, and modifications are within the scope of the following claims. All references cited herein are incorporated by reference in their entirety and made part of this application.

What is claimed is:

1. A method for providing content recommendations, comprising:
    receiving, at a processing device of a recommendation server, a plurality of preference values associated with each of a plurality of content elements, wherein each preference value is a value between a first end point and a second end point, the first end point representing a dislike of the associated content element and the second end point representing a liking for the associated content element;
    determining, with the processing device, a plurality of polarity scores for the plurality of content elements based on the associated plurality of preference values, wherein each polarity score represents an amount by which the associated plurality of preference values differ from an average value of the associated plurality of preference values;
    receiving, at the processing device, a request from a user to access the recommendation server;
    determining, with the processing device, whether the user has previously accessed the recommendation server more than a threshold number of times;
    increasing, with the processing device, a polarity score threshold when the user has previously accessed the recommendation server more than the threshold number of times;
    comparing, with the processing device, the plurality of polarity scores to the polarity score threshold; and
    in response to determining that a polarity score of the plurality of polarity scores does not exceed the polarity score threshold, transmitting, to a client device for display, a recommendation for a content element associated with the polarity score.

2. The method of claim 1, wherein the comparing and transmitting are performed in response to determining that the user has not previously accessed the recommendation server.

3. The method of claim 1, wherein the polarity score threshold is a minimum polarity score of the plurality of polarity scores.

4. The method of claim 1, wherein determining a plurality of polarity scores for the plurality of content elements comprises calculating an average value of the plurality of preference values associated with at least one of the plurality of content elements.

5. The method of claim 1, wherein the polarity score associated with the content element further represents a concentration of the plurality of preference values associated with the content element around two or more different values between the first and second end points.

6. The method of claim 1, wherein transmitting the recommendation for the content element comprises transmitting metadata descriptive of the content element.

7. The method of claim 1, wherein transmitting the recommendation to the client device for display comprises transmitting the recommendation to the client device for display on a user device, and wherein the user device is in communication with the client device.

8. The method of claim 1, wherein the plurality of preference values associated with the content element is based on user ratings of the content element.

9. The method of claim 1, wherein the polarity score threshold is based on a user history.

10. The method of claim 1, wherein the polarity score is based on a number of peaks in a distribution of the plurality of preference values.

11. A system for providing content recommendations, comprising:
    a memory configured to store a plurality of preference values associated with each of content elements, wherein each preference value is a value between a first end point and a second end point, the first end point representing a dislike of the associated content element and the second end point representing a liking for the associated content element;
    an output device configured to transmit a recommendation for a content element to a client device for display; and
    a processing device in communication with the memory and the output device and configured to:
        determine a plurality of polarity scores for the plurality of content elements based on the associated plurality of preference values, wherein each polarity score represents an amount by which the associated plurality of preference values differ from an average value of the associated plurality of preference values;
        receive, at the processing device, a request from a user to access the recommendation server;
        determine, with the processing device, whether the user has previously accessed the recommendation server more than a threshold number of times;
        increase, with the processing device, a polarity score threshold when the user has previously accessed the recommendation server more than the threshold number of times;
        compare the plurality of polarity scores to the polarity score threshold; and
        in response to determining that a polarity score of the plurality of polarity scores does not exceed the polarity score threshold, transmit, to the client device for display via the output device, a recommendation for a content element associated with the polarity score.

12. The system of claim 11, wherein the comparing and transmitting are performed in response to determining that the user has not previously accessed the recommendation server.

13. The system of claim 11, wherein the polarity score threshold is a minimum polarity score of the plurality of polarity scores.

14. The system of claim 11, wherein determining the plurality of polarity scores for the plurality of content elements comprises calculating an average value of the plurality of preference values associated with at least one of the plurality of content elements.

15. The system of claim 11, wherein the polarity score associated with the content element further represents a concentration of the plurality of preference values associated with the content element around two or more different values between the first and second end points.

16. The system of claim 11, wherein transmitting the recommendation for the content element comprises transmitting metadata descriptive of the content element.

17. The system of claim 11, wherein transmitting the recommendation to the client device for display comprises transmitting the recommendation to the client device for display on a user device, and wherein the user device is in communication with the client device.

18. The system of claim 11, wherein the plurality of preference values associated with the content element is based on user ratings of the content element.

19. The system of claim 11, wherein the polarity score threshold is based on a user history.

20. The system of claim 11, wherein the polarity score is based on a number of peaks in a distribution of the plurality of preference values.

* * * * *